US012158065B2

(12) United States Patent
Braniff et al.

(10) Patent No.: US 12,158,065 B2
(45) **Date of Patent: *Dec. 3, 2024**

(54) INTEGRATED END-TO-END WELL CONSTRUCTION AUTOMATION SYSTEM

(71) Applicant: TRANSOCEAN SEDCO FOREX VENTURES LIMITED, Grand Cayman (KY)

(72) Inventors: Barry Braniff, Houston, TX (US); Jason Baker, Houston, TX (US); Michael Coady, Houston, TX (US); Shane Mcclaugherty, Houston, TX (US); Scott McKaig, Houston, TX (US); Luis R. Pereira, Houston, TX (US); Craig Mccormick, Houston, TX (US); Kenny Thomson, Houston, TX (US); Darrel Pelley, Houston, TX (US)

(73) Assignee: TRANSOCEAN SEDCO FOREX VENTURES LIMITED, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/387,708

(22) Filed: Nov. 7, 2023

(65) Prior Publication Data

US 2024/0295171 A1 Sep. 5, 2024

Related U.S. Application Data

(63) Continuation of application No. 17/860,753, filed on Jul. 8, 2022, now Pat. No. 11,808,132, which is a (Continued)

(51) Int. Cl.

*E21B 44/00* (2006.01)
*G08B 21/18* (2006.01)

(52) U.S. Cl.

CPC ............ *E21B 44/00* (2013.01); *G08B 21/187* (2013.01); *E21B 2200/20* (2020.05)

(58) Field of Classification Search

CPC .... E21B 44/00; E21B 2200/20; G08B 21/187
(Continued)

(56) References Cited

U.S. PATENT DOCUMENTS

| | | | | |
|---|---|---|---|---|
| 11,143,010 | B2 | 10/2021 | Zheng et al. | |
| 11,808,132 | B2 * | 11/2023 | Braniff | G08B 21/187 |

(Continued)

FOREIGN PATENT DOCUMENTS

| | | | |
|---|---|---|---|
| WO | 2019099693 | A1 | 5/2019 |
| WO | 2022072396 | A1 | 4/2022 |
| WO | 2022072429 | A2 | 4/2022 |

OTHER PUBLICATIONS

Int'l Search Report and Written Opinion issued Jan. 31, 2022 in Int'l Application No. PCT/US2021/053357.
Office Action issued Jan. 3, 2023 in U.S. Appl. No. 17/860,753.

*Primary Examiner* — Michael J Brown

(74) *Attorney, Agent, or Firm* — Panitch Schwarze Belisario & Nadel LLP

(57) ABSTRACT

An end-to-end well construction system includes an e-program for receiving a first input selected from well planning data, rig historical performance data, rig parameters, drilling engineering input, management of change, and a combination thereof, and configured to produce a first output selected from a machine and/or human readable sequence, a time depth curve, a drilling program, and a combination thereof, and a second output including analytics data. Further, the end-to-end well construction system includes a drilling control layer, configured to receive the first output from e-program, and to produce a third output including an automated sequence, and a smart well analytics system configured to receive the analytics data from the e-program (Continued)

and a second input selected from drilling data, downhole data, base data from the e-program, a modeling software, and a combination thereof, and to produce a fourth output to the drilling control layer for automated adjustment.

18 Claims, 10 Drawing Sheets

Related U.S. Application Data continuation of application No. PCT/US2021/053357, filed on Oct. 4, 2021.

(60) Provisional application No. 63/086,660, filed on Oct. 2, 2020.

(58) Field of Classification Search
USPC ........................................................ 175/24
See application file for complete search history.

(56) References Cited

U.S. PATENT DOCUMENTS

| | | | | |
|---|---|---|---|---|
| 2016/0047220 | A1* | 2/2016 | Sharp ..................... | G06F 30/20<br>700/275 |
| 2018/0075544 | A1 | 3/2018 | Passolt et al. | |
| 2019/0284911 | A1 | 9/2019 | Wu et al. | |
| 2020/0165913 | A1 | 5/2020 | Benson et al. | |
| 2020/0256181 | A1 | 8/2020 | Jamieson et al. | |
| 2022/0025753 | A1 | 1/2022 | Heidari et al. | |

* cited by examiner

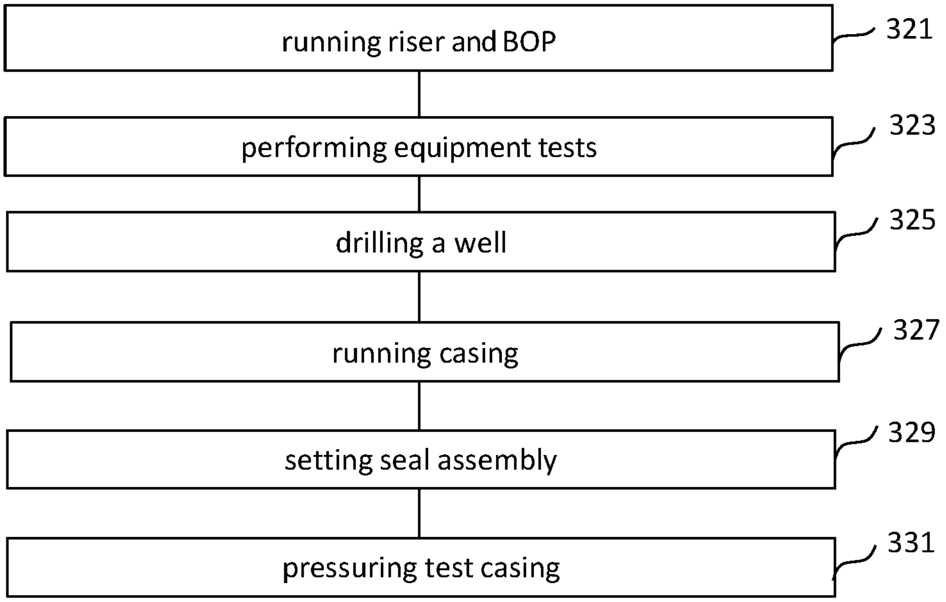

*FIG. 3B*

1. Run riser and BOP, latch up to the wellhead.
2. Perform deadman test, auto-shear test, ROV hot stab test, subsea EDS test, and 22” casing test.
3. Perform connector and BOP test per rig-based procedure.
4. Drill out shoe track, perform FIT/LOT
5. Drill 18-1/8” x 21”hole to 17,000 MD/TVD
6. Run 16” liner to 18,000’ MD/TVD and cement. Pressuretest liner.
7. Drill out shoe track, perform LOT, drill 14-3/4” hole to21,950’ MD / 21,800’ TVD
8. Run 12-1/4” casing to 21,925’ MD / 21,725’ TVD and cement.
9. Set 12-1/4” seal assembly.
10. Pressure test 12-1/4” casing.

*FIG. 3C*

INTEGRATED END-TO-END WELL CONSTRUCTION AUTOMATION SYSTEM

RELATED APPLICATIONS

This application claims priority to and the benefit of U.S. Provisional Patent Application No. 63/086,660, filed on Oct. 2, 2020, the disclosure of which is hereby incorporated by reference in its entirety.

TECHNICAL FIELD

The present disclosure generally relates to well construction processes and, in particular, to a system for optimizing a well construction plan and for automating well construction using sensors and a controller for controlling operations of rig equipment.

BACKGROUND

An end-to-end closed loop workflow for well construction planning and automation does not exist as an integrated solution. Prior attempts at integrating automation and retrofitting into the existing drilling control network has proven to be ineffective and requires additional elements. Existing well/rig information is not effectively integrated and is contained in multiple systems and file formats thus there is not an automated system to provide a seamless transfer of information from one application/person to the next. In addition, existing rig historical performance data are not included at a detailed/activity level to predict the performance of a given well construction program. Further, existing automation technologies (e.g., NOVOS Reflective Drilling System, multi-machine control) are not well integrated, do not typically synchronize across original equipment manufacturer (OEM) boundaries and are limited in scope, thus they cannot fully automate a well program. Furthermore, existing real-time well performance feedback systems (e.g., eDrilling, beAware), do not provide automated actions to the machines, nor do they optimize critical path and offline activities.

Accordingly, there exists a need for a system that permits an integrated end-to-end well construction automation process.

SUMMARY

Optimizing a well construction plan and receiving feedback from various sensors of rig equipment is important for minimizing the well construction costs. In particular, an end-to-end well construction automation system is needed for optimizing every step of well construction. In particular, well construction optimization needs to rely on historical well construction data, and lessons learned when constructing wells. The present disclosure presents a systematic approach for designing an integrated end-to-end well construction automation system that minimizes operational well construction costs.

Consistent with a disclosed embodiment, an end-to-end well construction system for planning and performing well construction operations includes an e-program configured to receive a first input selected from well planning data, rig historical performance data, rig parameters, drilling engineering input, management of change, and a combination thereof. Further, e-program is configured to produce a first output selected from a machine and/or human readable sequence, a time depth curve, a drilling program, and a combination thereof. Also, e-program is configured to produce a second output that includes analytics data. Further, the end-to-end well construction system includes a drilling control layer configured to receive the first output from the e-program, and to produce a third output that includes an automated sequence. Further, the end-to-end well construction system includes a smart well analytics system configured to receive the analytics data from the e-program and a second input selected from drilling data, downhole data, base data from the e-program, a modeling software, and a combination thereof, and to produce a fourth output to the drilling control layer for automated adjustment.

In some embodiments of the end-to-end well construction system, the fourth output produced by the smart well analytics system includes an automated operation configured to prevent damage to one of rig equipment, a well, a rig, or combination thereof.

In some embodiments of the end-to-end well construction system, the fourth output produced by the smart well analytics system includes an automated operation configured to prevent unplanned events that could cause loss of material, well consumables, or major delays in the well construction.

In some embodiments of the end-to-end well construction system, the fourth output produced by the smart well analytics system includes an alarm to personnel of a rig.

In some embodiments of the end-to-end well construction system, the system further comprises a smart tally system configured to capture and track tubular information, and to produce a fifth output regarding the tubular information to the drilling control layer and the smart well analytics system.

In some embodiments of the end-to-end well construction system, the e-program comprises a first e-program local to a drill site and a second e-program that is cloud-based, the first e-program system being configured to synchronize with the second e-program.

In some embodiments of the end-to-end well construction system, the first e-program is positioned at a drill site; the second e-program is positioned remote from the drill site; and the synchronization between the first and second e-programs occurs on demand or on a schedule.

In some embodiments of the end-to-end well construction system, the smart well analytics system comprises a first smart well analytics system local to a drill site and a second smart well analytics system that is cloud-based, the first smart well analytics system being configured to synchronize with the second smart well analytics system.

In some embodiments of the end-to-end well construction system, the first smart well analytics system is positioned at the drill site; the second smart well analytics system is positioned remote from the drill site; and the synchronization between the first and second analytics systems occurs on demand or on a schedule.

In some embodiments of the end-to-end well construction system, the well planning data include at least one of a planned casing, a planned completion tubing and assemblies, expected formation pressures, a planned trajectory, a planned drill pipe, planned bottom hole assemblies, or planned mud type and weight.

In some embodiments of the end-to-end well construction system, the rig historical performance data includes at least one of time required to perform all tasks associated with the construction of a well, speed at which casing is ran, speed at which a tubular is ran, time to perform a blow-out preventer (BOP) pressure test, time to slip and cut drill line, or time to rig up to run casing.

In some embodiments of the end-to-end well construction system, the rig parameters include at least one of operations that can be performed in parallel, maximum pressure capability of mud pumps, mud storage capabilities, top drive rotational capabilities, top drive torque capabilities, hoisting capacity, setback capacity, or length of bails.

In some embodiments of the end-to-end well construction system, the drilling engineering input is provided by a well operator in relation to a planned operation at a drill site.

In some embodiments of the end-to-end well construction system, the management of change includes an input from a human operator.

In some embodiments of the end-to-end well construction system, the automated sequence includes at least one of tripping, drilling, circulating, reaming, pumping, casing running, liner running, completion tubing and assemblies running, riser running, BOP testing, friction testing, formation integrity testing, or casing testing.

In some embodiments of the end-to-end well construction system, the smart well analytics system is configured to provide early warnings based on the analytics data.

In some embodiments of the end-to-end well construction system, the analytics data includes acceptable ranges of parameters for rig equipment.

In some embodiments of the end-to-end well construction system, the drilling data are generated by drilling equipment and includes at least one of a torque applied to a drill pipe, a well flow rate, pressure in well, a depth of the well, a rate of penetration, slip-to-slip times, weight-to-weight times, or a weight applied to the drill pipe.

In some embodiments of the end-to-end well construction system, the downhole data are generated during well construction and includes at least one of a real time trajectory, gas readings, equivalent circulating density, mud weights, or mud properties.

In some embodiments of the end-to-end well construction system, the base data from the e-program is the well information and includes at least one of casing details, completion tubing and assemblies details, bottom hole assembly (BHA) details, mud weight in use, or mud properties.

In some embodiments of the end-to-end well construction system, the modeling software is configured to determine performance of rig equipment under operational conditions.

In some embodiments of the end-to-end well construction system, the smart well analytics system is configured to issue an alarm based on information received from the drilling data or the downhole data.

In some embodiments of the end-to-end well construction system, the alarm is issued due to positive and negative drilling break, pump speed, pump pressure, hookload, equivalent circulating density, downhole and surface tubular torque, tubular drag, gas levels, well control warning signs, trajectory deviations, hole cleaning, or mud property changes.

In some embodiments of the end-to-end well construction system, the alarm is issued when the information indicates a positive kick.

In some embodiments of the end-to-end well construction system, after the alarm is issued, the drilling control layer is configured to initiate an automated shut-in sequence.

In some embodiments of the end-to-end well construction system, the tubular information includes at least one of bit depth, connection torque, tool joint dimensions, on bottom rotating hours for all tubulars, tool joint position in the well, location of a non-shearable tubular in the well, or a combination thereof.

Consistent with another disclosed embodiment, a method of making a well at a drill site includes receiving by an e-program an input selected from well planning data, rig historical performance data, rig parameters, drilling engineering input, management of change, and a combination thereof, and producing by the e-program an output including a well operations program. The well operations program is selected to minimize a cost function associated with costs of making the well, and wherein the well operations program is determined such that it is accepted as an input by a drilling control layer configured to generate a sequence that can be executed by one of associated rig equipment, a human operator, or a combination thereof.

In some embodiments of the method of making a well, the well operations program includes machine and/or human readable information associated with a sequence of steps for constructing the well.

In some embodiments of the method of making a well, the machine and/or human readable information includes a time depth curve.

In some embodiments of the method of making a well, the method further comprises receiving from a plurality of sensors associated with the rig equipment sensor data and based on the sensor data, adjusting operation parameters of rig equipment when such adjustment is determined to be needed.

In some embodiments of the method of making a well, the adjustment is determined to be needed if the adjustment further minimizes the cost function.

In some embodiments of the method of making a well, the adjustment is further determined based on the input to the e-program, and/or based on data generated by the e-program for determining the drilling program.

In some embodiments of the method of making a well, the sensor data include drilling data, downhole data, or a combination thereof.

In some embodiments of the method of making a well, the method further comprises tracking tubular information and providing real time input of the tubular information to the drilling control layer.

In some embodiments of the method of making a well, the method further comprises tracking a quantity of a material that is being used for well construction.

In some embodiments of the method of making a well, the e-program comprises a first e-program local to a drill site and a second e-program that is cloud-based, the first e-program being configured to synchronize with the second e-program.

In some embodiments of the method of making a well, the first e-program is positioned at a drill site; and the second e-program is positioned remote from the drill site; the method further comprising synchronizing the first and second e-programs on demand or on a schedule.

In some embodiments of the method of making a well, the well planning data include at least one of planned casing, planned completion tubing and assemblies, expected formation pressures, planned trajectory, planned drill string, planned bottom hole assemblies, or planned mud type and weight.

In some embodiments of the method of making a well, the rig historical performance data include at least one of a speed at which casing is ran, a speed at which a tubular is ran, time to perform a blow-out preventer (BOP) pressure test, time to slip and cut drill line, or time to rig up to run casing.

In some embodiments of the method of making a well, the rig parameters include at least one of information about operations that can be performed in parallel, maximum pressure capability of mud pumps, mud storage capabilities, top drive rotational capabilities, top drive torque capabilities, hoisting capacity, setback capacity, or length of bails.

In some embodiments of the method of making a well, the drilling engineering input is provided by a well operator in relation to a planned operation at the drill site.

In some embodiments of the method of making a well, the cost function includes an estimation of a probability of an unplanned event.

In some embodiments of the method of making a well, the cost function includes a determination of an expected total time required for making the well, and wherein the cost function is unacceptably high when the expected total time is above a total time threshold value.

In some embodiments of the method of making a well, the cost function includes a determination of an expected deviation from the expected total time required for making the well, and wherein the cost function is unacceptably high when the expected deviation is above a deviation threshold value.

In some embodiments of the method of making a well, the sequence includes at least one of tripping, drilling, circulating, reaming, pumping, casing running, liner running, completion tubing and assemblies running, riser running, BOP testing, friction testing, formation integrity testing, or casing testing.

In some embodiments of the method of making a well, the method further comprises providing an early warning based on the well data.

In some embodiments of the method of making a well, the drilling data are generated by drilling equipment and include at least one of a torque of a drill pipe, a flow rate in a well, well pressure, or well depth.

In some embodiments of the method of making a well, the downhole data are generated during well construction and include at least one of real time trajectory or equivalent circulating density.

In some embodiments of the method of making a well, the drilling program includes at least one of information comprising casing details, completion tubing and assemblies details, bottom hole assembly (BHA) details, mud weight in use, or mud properties.

In some embodiments of the method of making a well, the drilling engineering input include modelling software configured to determine performance of the rig equipment under operational conditions.

In some embodiments of the method of making a well, the modeling software is configured to determine stresses and loads onto a drill pipe.

In some embodiments of the method of making a well, the modeling software is configured to determine buckling of a drill pipe.

The foregoing general description and the following detailed description are exemplary and explanatory only and are not restrictive of the claims.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 3B is a human readable output of an example sequence of operations for well construction, according to an embodiment.

FIG. 3C is a human readable output of an example sequence of operations for well construction, according to an embodiment.

DETAILED DESCRIPTION

Aspects of the present disclosure are related to an integrated end-to-end automation system for well construction. The integrated end-to-end automation system includes a computing system for optimizing a well construction plan (herein also referred to as a well operations plan or a well operations program) based on a proposed well plan (well plan is also referred to as well planning data). For example, the proposed well plan is provided as an initial input for the computing system, and an optimized well operations plan includes all the necessary steps for constructing the proposed well that minimize costs. In some cases, the computing system for optimizing the well construction plan is designed to tailor the plan to the rig's specific equipment capabilities and historical performance for executing operations based on those capabilities.

Additionally, based on the proposed well plan, the computing system for optimizing the well operations plan is configured to provide various possible contingencies (e.g., when an oil or gas field is not found at a particular depth at which the oil or gas field is expected to be found), and how these contingencies can be addressed (e.g., drilling deeper, drilling at an angle, or starting a new well). Various other contingencies may be also addressed by the computing system as further described below. In some cases, when these contingencies do not require changes to the well operations plan, but require changes to parameters associated with well operations, the computing system is configured to determine the required operational parameter changes (and subsequently execute such changes during well construction).

Figure 1:
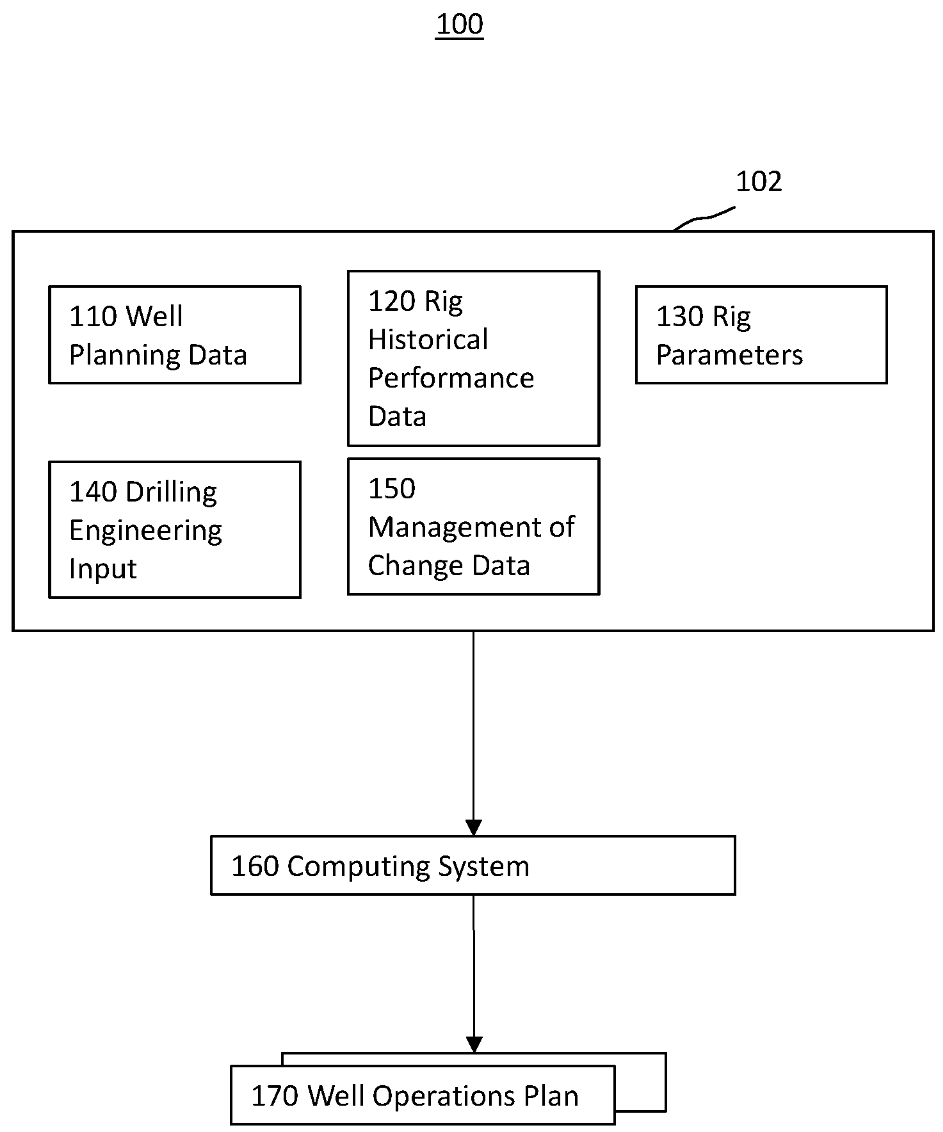
FIG. 1 is an example diagram of an example computing system for generating an optimized well operations plan, according to an embodiment.

FIG. 1 shows an example diagram of a system 100 for optimizing well construction operations, according to an embodiment. An example system includes a computing system 160 configured to receive well input data 102. In an example embodiment, well input data 102 includes, but are not limited to, well planning data 110, rig historical performance data 120, rig parameters 130, drilling engineering input 140, and management of change data. Upon receiving well input data 102, computing system 160 is configured to determine optimized well operations plan 170.

Well planning data 110 includes well meta data (e.g., well name, well number, and the like), a location of a well (e.g., geo-coordinates of a start of the well and geo-coordinates of an end of the well), a planned well trajectory from the well start location to the well end location, a depth of an ocean to the well start location (when the well is constructed offshore), as well as geological information, such as expected formation pressures, expected geological formation layers, or any other geological information (e.g., expected gases discharged from the well, expected drilling problems, such as sloughing shales, swelling shales, salt beds, faults, high angle beds, and the like). Further, well planning data 110 includes information about a date (or specified date interval) at which well construction needs to be started, and what type of weather is expected at the well location at the time when the well is being constructed (alternatively, weather information may be determined by computing system 160 based on historical weather patterns for the well location and the construction date). In some cases, well planning data 110 includes planned casing as well as planned drill string(s). Further, well planning data 110 may include expected temperature at the bottom of the well, diameters of different well sections, lengths of different well sections, as well as the types of enforcement for different well sections. Further, well planning data 110 may include a planned casing, or a planned completion tubing (e.g., a number of casings, or completion tubing needed for constructing the well). Completion tubing is a type of conduit that is used to bring oil and gas from the producing formations to the field surface facilities for processing. Frequently, completion tubulars are used to protect the inside of the well casing from corrosion. These tubulars are cheaper and more expendable than the well casing, thus, permanent casing is rarely used as a conduit to get oil. Additionally, well planning data 110 may include planned assemblies (e.g., any suitable equipment that is used downhole for instrumentation, packing, or cleaning). Such equipment, for example may include circulating subs, tubing releases, shock absorbers, Y block assemblies, blast joints, gun hanger systems, swivel subs, or any other suitable equipment that can be used downhole. Also, well planning data 110 may include expected formation pressures, a planned trajectory, a planned drill pipe, planned bottom hole assemblies, or planned mud type and weight.

It should be appreciated that well planning data 110 may include other "environmental" information related to location of the well and the date at which the well is scheduled to be constructed. For example, well planning data 110 may include information about environmental regulations at the well location, list of permits that need to be obtained, environmental and safety regulations for well construction based on specific events during the well construction (e.g., environmental regulations associated with sealing the well when no oil or gas is found), or any other environmental factors associated with a location of the well and the starting date of well construction (e.g., regulations for how many wells can be constructed and a minimal distance between the wells).

Rig historical performance data 120 is based on historical performance data of a rig that is scheduled to perform the well construction operations. In some cases, computing system 160 is configured to suggest rig characteristics based on the type of well that needs to be constructed. For example, computing system 160 may have access to data for different rigs and may be configured to select a particular rig from a list of rigs, for performing well construction. Alternatively, a rig with associated rig equipment is provided to computing system 160.

In various implementations, rig historical performance data 120 is obtained based on historical data of well construction for the rig. For example, historical data associated with the rig when constructing a well that is similar to the one described in the proposed well plan is used for determining various rig historical performance data 120. In an example implementation, rig historical performance data 120 for different wells and different rigs are stored in a database and is accessible by computing system 160. Rig historical performance data 120 may include time required to perform all tasks associated with the construction of a well, speed at which casing is ran, speed at which a tubular is ran, time to perform a blow-out preventer (BOP) pressure test, time to slip and cut drill line, or time to rig up to run casing.

Rig parameters 130 includes mechanical specific capabilities of rig equipment. rig parameters 130 includes various parametric ranges at which the rig equipment may operate. For example, rig parameters 130 may include maximum and minimum speed/torque that can be provided by a top drive to drive a drill pipe, maximum weight that can be lifted by drawworks, maximum storage capacity for the rig, information about operations that can be performed in parallel, maximum pressure capability of mud pumps, mud storage capabilities, reaction time of BOP, top drive rotational capabilities, top drive torque capabilities, hoisting capacity (e.g., how much weight can be held by a derrick or the amount of weight that can be supported by a drawworks), setback capacity (the weight of a drill pipe stacked in the derrick plus the weight of casing that can be lifted), or length of bails. In an example implementation, rig parameters for different wells and different rigs can be stored in a database and is accessible by computing system 160.

Further, in some cases, rig parameters 130 includes information about control systems available for the rig. For example, rig parameters 130 includes information about operations that can be performed automatically without (or with minimal) human supervision. In some cases, rig parameters 130 includes information about what sequences of operations may be performed automatically, and what sequence of operations may be performed in parallel. Further, rig parameters 130 includes information on how many human operators need to be available for various sequences of rig operations. For example, if particular steps of well construction do not require use of many human operators, these operators may be engaged in other well construction related activities. Alternatively, well construction operations that do not require input from many human operators may be executed from a remote location whereby human operators are not physically present.

Further, rig parameters 130 may include a speed at which casing is ran into the well, a power characteristics of equipment available to the rig (e.g., power of a top drive used by the rig), a speed at which a tubular is ran into the well, time needed to perform a blow-out preventer (BOP) pressure test, time needed to slip and cut drill line, time needed to rig up to run casing, or any other characteristics of equipment for the rig. For example, rig parameters 130 may include an amount of storage available for the rig, a number of wells that can be constructed in parallel, a type of operations that can be done in parallel on the rig, a type of BOP available for the rig, and the like. Rig parameters 130 can be stored in a database from which computing system 160 can access.

Additionally, in some implementations, rig parameters 130 includes information about sensors available for providing feedback regarding performance of various rig equipment. The sensors allow for determining what type of data can be used for feedback, and how such feedback may be used for modifying well operations plan, as further described below.

Drilling engineering input 140 includes a list of questions that need to be answered by a well operator to follow industry accepted standards with regard to the sequence of operations for well construction. Such questions include, for example: will a formation integrity test be performed? will a casing test be performed? how long will the well be circulated once total depth is reached/drilled? will a shallow test of the logging tools be performed? will the well be circulated prior to cementing operations? for how long/what volume will be pumped into the well? what fluid will be pumped? what flowrate will be used? or any other suitable questions. Herein, circulating the well includes circulating a flow of mud down the drill pipe and back to the rig in order to remove the cuttings debris or other well contaminants while keeping a constant pressure profile in the annulus for maintaining a well integrity. Additionally, drilling engineering input 140 includes information about modelling software configured to determine the performance of the rig equipment under operational conditions. For example, the modeling software may be configured to determine stresses and loads onto a drill pipe, or to determine buckling of a drill pipe. Drilling engineering input 140 may further include information about databases used to determine the performance of the rig equipment under operational conditions (e.g., a database may be used to infer drilling location specific performance parameters such as tripping speeds in specific environmental conditions).

In an example embodiment, well operations plan 170 includes human readable data (e.g., a human readable operational plan) and machine-readable data (e.g., instructions implemented as binary data). Management of change 150 includes information about a specific process used by computing system 160 which allows changes to be made to well operations plan 170. Consistent with the definition of management of change known in the art in the context of drilling, management of change 150 can apply to process changes (hardware or process conditions), procedural changes and organizational changes. The process includes steps for review and authorization prior to implementation, as well as steps to ensure that the change is communicated, and pertinent documents are kept up to date. In some implementations, the changes are provided as updates/new revisions to the machine readable and human readable data of well operations plan 170. Management of change 150 process is implemented and used when determining how a change, which occurs during well construction, affects the well operations plan 170. In an example embodiment, management of change 150 includes identifying well construction events (e.g., hazards) and their potential effects on personnel, environment, cost, and assets (e.g., rig equipment). In various implementations, deviations from the original well operations plan 170 may become necessary due to geological/subsurface uncertainties or problems encountered during the course of well construction. Management of change 150, thus, is a change control procedure and a useful tool for facilitating agreements for such changes, while ensuring that automation for those changed operations are seamlessly executed.

In some cases, e-program 161A (or 161B) is configured to have a template of all the personnel necessary to approve the changes to the well operations plan. In an example embodiment, e-program 161A (or 161B) is configured to notify all involved personnel and possibly will require electronic signatures to allow critical changes to the well operations plan (e.g., a critical change may include a change that leads to a significant increase in costs, such as increase in costs of more than five percent).

In various embodiments, well input data 102 is processed by computing system 160 to produce a well operations plan 170 which is optimized by minimizing a cost function associated with a well construction. In an example embodiment, the cost function is determined such that an expected cost of constructing a well is minimized without sacrificing safety of the well construction. In various embodiments, the expected cost of the well construction is calculated based on an estimation of probabilities of different events that may occur during the well construction, as further described below in relation to FIG. 7. In some embodiments, the expected cost is a function of time—the shorter the time to construct the well, the lower the expected cost. Additionally, as further described below, computing system 160 may further include smart well analytics (SWA) configured to adjust parameters of various well construction processes based on a feedback received from various sensors of rig equipment. Further, computing system 160 may be configured to revise well operations plan 170 based on various events that might occur during well construction. For example, if it is determined that oil or gas is not found at a given depth, well operations plan 170 may be revised using a management of change processes. For instance, if the oil or gas is not found at the given depth, it might be determined that a deeper well is required.

Figure 2:
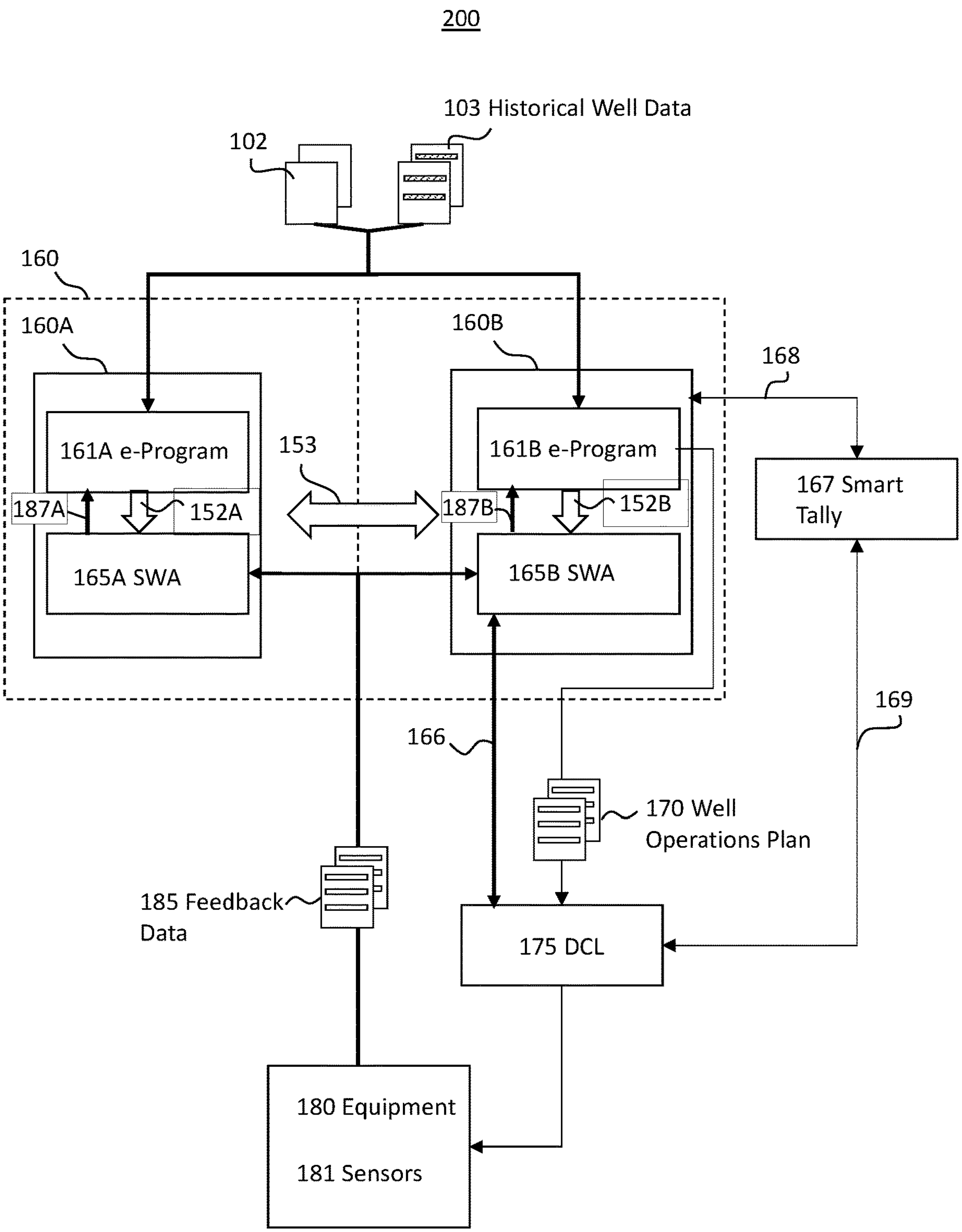
FIG. 2 is an example diagram of a system for implementing integrated end-to-end well construction, according to an embodiment.

FIG. 1 shows only a part of an end-to-end well construction system configured to determine an optimized well operations plan 170. In various embodiments, an end-to-end well construction automation system further includes other components for ensuring that the entire well construction is executed seamlessly according to the optimized well operations plan 170. An example an end-to-end well construction system 200 that includes a plurality of components is shown in FIG. 2. In an example embodiment, computing system 160 includes a first computing system 160A located onshore, and a second computing system 160B located offshore (e.g., on a rig that is configured to execute well construction).

In an example embodiment, onshore computing system 160A includes an e-program 161A configured to do planning and optimization of well operations plan 170. Further, at least some planning and optimization of well operations plan 170 may be performed offshore using e-program 161B of offshore computing system 160B. In an example embodiment, e-program 161A may have access to more resources than offshore e-program 161B. For example, e-program 161A may have access to computer clusters, multiple databases, and the like. In various embodiments, e-program 161A is configured to have an uninterrupted network service. Further, e-program 161A may obtain input from human operators located at different locations onshore and offshore. For example, e-program 161A may receive information from different wells, different rigs, and the like. Further, e-program 161A is configured to communicate with e-program 161B to transmit any necessary data.

e-Program 161B is configured to further optimize the well construction process. In some cases, e-program 161B may receive well operations plan 170, with some steps of well operations plan 170 requiring further optimization based on rig characteristics. In such cases, e-program 161B is configured to further optimize well operations plan 170 based on the rig characteristics. Additionally, an operator of e-program 161B may be allowed to overwrite at least some operations of well operations plan 170 based on local conditions of a rig (e.g., based on sea conditions at a rig location). Additionally, e-program 161B is configured to perform various operations of well operations plan 170 even when e-program 161B has lost communication with an onshore server. For example, e-program 161B is configured to perform suitable operations when there is no connection between e-program 161B and e-program 161A or any other connections between computing systems 160A and 160B.

As shown in FIG. 2, both e-program 161A and 161B are configured to receive well input data 102 as well as historical well data 103. Historical well data 103 includes any relevant data related to the well construction based on previous well construction projects.

In an example embodiment, historical well data 103 includes well operations plans similar to well operations plan 170 for similar type of wells (e.g., wells described by similar well planning data 110 for which well construction was performed using rig that is similar (or the same as) to the rig scheduled to perform the well construction descried by well input data 102). Further, historical well data 103 can include how well the previous well operations plans were implemented for the similar type of wells (e.g., whether the previous well operations plans were implemented on time or with delays, and if delays were encountered, what was a cause for the delays). Historical well data 103 can also include changes to well operations plans implemented during previous well constructions, and the causes for such changes. Additionally, historical well data 103 can include all the safety incidents that were encountered for the similar wells, and how these safety incidents were addressed in subsequent well construction projects for similar types of wells. Further, historical well data 103 can include weather logs for previous well constructions, number of human operators available for previous well constructions, the amount of material used for previous well constructions, as well as the type of equipment, the age of that equipment, historical usage of the equipment, and a redundancy in the equipment for previous well constructions. Additionally, in some implementations, historical well data 103 includes description of type of computing systems that were used for previous well constructions, type of controllers used, as well as types and a number of sensors used for previous well constructions. In some implementations, historical well data 103 includes time logs about submission of permission requests, or any other paperwork associated with well construction. Further, historical well data 103 include time logs about operations of different equipment (e.g., a time log about use of a top drive, such as a speed of the top drive for different times, a position of the top drive, and the like), when constructing previous wells.

In some cases, historical well data 103 include "lessons learned," such as instructions that should be implemented to avoid previous delays (or safety incidents) associated with previous well constructions.

In various embodiments, e-programs 161A and 161B are configured to analyze historical well data 103 and, based on well input data 102, to determine an optimized well operations plan 170. In various embodiments, optimized well operations plan 170 is configured to result in well construction that has similar or lower expected costs that the costs associated with previous well constructions when constructing wells of the similar type as the well that is scheduled to be constructed. In various embodiments, optimized well operations plan 170 is configured to result in well construction that minimizes the costs. For example, optimized well operations plan 170 is configured to result in well construction that minimizes the time needed to construct a well. Further, the optimized well operations plan 170 is configured to have zero expected safety incidents. In various embodiments, every operation of well operations plan 170, which can possibly lead to a safety incident (the possibility is estimated as a probability of a safety incident that is above a target threshold value), is either abandoned or replaced by another equivalent operation (or an equivalent set of operations) that is (are) safe.

In some cases, to determine well operations plan 170, e-programs 161A and/or 161B utilize decision trees. For example, e-programs 161A and/or 161B determine a first set of operations following by a particular conditional test. In an example embodiment, a particular conditional test may include determining if an oil or gas is found at a given depth. The conditional test can include one or more Boolean expressions. For example, if condition evaluates to true, a second set of operations is performed, and if condition evaluates to false, a third set of operations is performed. For example, if an oil and/or gas field is found, the well drilling is completed, and if the oil and/or gas field is not found, the well may be drilled to a greater depth. In some cases, well operations plan 170 includes interrupt conditions, which, when encountered, interrupt otherwise planned operations associated with well operations plan 170. Such interrupt conditions include, for example, increasing formation fluid pressures which if left unchecked could result in an unplanned flow of formation fluid (otherwise known as a 'kick'), weather conditions (e.g., hurricanes), and equipment failure. In various embodiments, e-programs 161A and 161B are configured to plan for one or more interrupt conditions (herein also referred to as contingencies), and how these contingencies should be addressed. In an example embodiment, when drilling at a certain depth, e-programs 161A and/or 161B may expect to encounter instances where there is an unexpected increase in formation pressure and a resultant kick from the well and may plan for specific sequence of operations when such contingencies are encountered.

In various embodiments, e-programs 161A and 161B include respective smart well analytics systems (SWA) 165A and 165B, as shown in FIG. 2. In various embodiments, SWA 165A and/or 165B are configured to provide a continued oversight, alarms, recommendations, and automatable options for either respective e-programs 161A and 161B, and/or human operators of system 200. In various embodiments, SWAs 165A and 165B are analytics application that fuse all relevant data received from various sensors of a rig to provide closed loop feedback including predictive insight into how equipment should be operated and how automated controls may need to be adjusted.

FIG. 2 shows that computing systems 160A and 160B are configured to communicate (as indicated by arrow 153) to exchange any relevant data. For example, when new historical well data 103 becomes available to computing system 160A, this data may be shared with computing system 160B. Further, if a contingency is experienced by a rig, such data is shared with computing system 160A by computing system 160B. Computing systems 160A and 160B can be synchronized on a schedule or on demand. For example, computing systems 160A and 160B can be synchronized about every 1-60 (e.g., about every second, about every 10 seconds, about every 20 seconds, about every 30 seconds, about every 40 seconds, about every 50 seconds, or about every 60 seconds) or about every 1-60 minutes (e.g., about every minute, about every 10 minutes, about every 20 minutes, about every 30 minutes, about every 40 minutes, about every 50 minutes, or about every 60 minutes).

In an example embodiment, e-programs 161A and 161B are configured to transmit data 152A and 152B respectively to SWAs 165A and 165B. In an example embodiment, each of data 152A and 152B include rig equipment specific data (e.g., data about operational parameters for different equipment available for the rig). In an example embodiment, data 152A and 152B may include torque ranges that may be applied by a top drive, a maximum weight that can be handled by an elevator configured to pick up tubular segments, or any other data related to rig operations. In some cases, operational ranges include positional ranges for a pipe racker (e.g., possible heights to which the pipe racker may lift tubular segments). In some cases, the operational ranges include maximum pressure capability of mud pumps, mud storage capabilities, or other parameters related to fluids and fluid valves available to the rig. In some cases, data 152A and 152B may include any suitable data of well input data 102. For example, data 152A and 152B may include rig parameters 130 received by e-programs 161A and 161B. Additionally, each of data 152A and 152B is configured to include any other suitable data required for SWAs 165A and 165B to determine if rig equipment is operating safely and within allowed parameter values. For example, data 152A and 152B may include programs or algorithms that can be executed by SWAs 165A and 165B to determine if the rig equipment is operating within allowed parameter values. In some embodiments, each of SWA 165A and SWA 165B is configured to: (a) predict an unsafe event through comparison with historical performance data, as provided by data 152A or 152B, and (b) provide an input to a drilling control layer (DCL 175, as shown in FIG. 2) to initiate a mitigation protocol automatically without operator intervention. For example, an operator can set twist-off prediction boundaries in SWAs 165A and 165B, and if the boundaries are breached for a predetermined time and frequency, DCL 175 will then act automatically without operator intervention to mitigate the torque severity by adjusting the soft torque or stick-slip mitigation control software's force feedback gain/speed/torque setpoints and present notification to operator that twist-off mitigation is active; once Slip Stick severity is within boundary tolerance the Twist-Off Mitigation action from the control system will be disengaged and normal Slip Stick control continues.

Further, SWA 165A and/or SWA 165B may be configured to maintain, in a database, a list of past events that has led to an unplanned event (or multiple unplanned events). In an example embodiment, the database may include unplanned events that happened at a drill site (or remote from the drill site). In some cases, data in the database may include time graphs (herein also referred to as time sequences) associated with previous well constructions. In some cases, SWA 165A and/or SWA 165B is configured to continuously compare the incoming data against these data or against the thresholds of allowable operational parameters for rig equipment. In some cases, SWA 165A and/or SWA 165B is configured to continuously compare a time series associated with a current well construction with time series of previous well constructions. The method of comparing the time sequence associated with the current well construction with time series of previous well constructions can include dynamic time warping, Hellinger distances or any other approaches, for which a comparison algorithm selects the most closely associated time series found in the database.

In various embodiments, system 200 is configured to include a smart tally system 167 configured to keep track of all the tubulars that are used for well construction, e.g., based on inputs from one or more sensors. Herein, the term "tubulars" include tubing joints, casing joints, drill pipe joints, riser joints, or joints of tubular tools that are used for various works (e.g., cleaning debris) in a well. In an example embodiment, smart tally system 167 is configured to keep track of any tubulars that are used for well construction. In various embodiments, as tubulars are being used, smart tally system 167 is configured to update the tally of these tubulars. Additionally, smart tally system 167 is configured to keep track of the depths and/or locations of the tubulars within the well (e.g., locations of a start of a tubular joint and a location of an end of a tubular joint). Keeping track of tubular locations within a well allows for determining where the tubular joints are within the well. Such determination may be important when shutting in the well during a kick. Further, smart tally system 167 is configured to report information about used tubulars by transmitting data through a data link 168 to e-program 161B. Additionally, smart tally system 167 is configured to transmit data related to the tubulars used to DCL 175, as described further below, via data link 169. The data from smart tally system 167 may be used by e-program 161B such that, additional tubulars may be planned to be delivered (if such additional tubulars are needed). In some cases, data link 168 may be further used to transfer data from e-program 161B to smart tally system 167. For example, such data may be transferred when smart tally system 167 needs to be updated, or when a new type of tubulars needs to be tracked by smart tally system 167.

As shown in FIG. 2, well operations plan 170 is transmitted by e-program 161B to DCL 175. DCL 175 is a controller including software instructions and computing means (e.g., a processor having a memory for storing the software instructions as well as various related data needed for operating DCL 175) for transforming instructions presented in well operations plan 170 into specific operational instructions for rig equipment 180. In an example embodiment, instructions of well operations plan 170 may not be specific to particular equipment 180 used by the rig. For example, an instruction of drilling a 17½-inch diameter hole to a depth of 9050 feet may be part of well operations plan 170 and may not specifically refer to any particular equipment available to the rig. In an example implementation, DCL 175 is configured to "translate" instructions of well operations plan 170 to a specific sequence of commands to rig equipment 180. For example, instruction of drilling a 17½ inch diameter hole may be "translated" by DCL 175 as a set of specific steps, such as (1) confirming that a stand (herein referred to as an incoming stand) of a drilling pipe for drilling the 17½ inch diameter hole is available at a fingerboard configured to house stands of the drilling pipe, (2) if the stand is available, retrieve the stand using a pipe racker, and translate the stand towards a well center of a drilling floor, (3) if the stand is not available, request the stand-building procedure. The stand-forming procedure may include multiple steps and may be performed using a pipe racker, an iron roughneck, a top drive, an elevator attached to the top drive, an auxiliary well center and the like. Further the specific steps may include (4) confirming that an existing stand is placed at the well center such that atop portion of the existing stand (herein is referred to as a stump) is extending above the well center, (5) determining the height of the stump using a suitable sensor (e.g., an optical sensor, which may contain a camera, a laser, a Lidar, and the like). Further steps may include (6) using the elevator, lifting the incoming stand by a pipe racker such that it is directly above the stump, (7) using the pipe racker, lowering the incoming stand towards the connection portion of the stump, and (8) using the pipe racker and an iron roughneck, rotating the incoming stand, and connecting the incoming stand with the stump. Further steps may include (9) rotating the drilling pipe using a top drive to drill a well while the drilling pipe is descending into the well by a predetermined distance.

In an example embodiment, when DCL 175 generates the machine-readable output, the output is produced according to the known interface capabilities of the individual machines. For example, output commands for an iron roughneck (represented as analog or digital signals) may be similar to the ones issued by a human operator when the human operator is controlling the iron roughneck. In some cases, commands issued by the human operator (e.g., when the human operator is controlling the iron roughneck using a joystick) may be recorded using a recording mode. Using such a mode, system 200 is configured to learn operational signals resulted when performing standard operations. It should be noted that some commands may encapsulate a large number of sub-command steps (e.g., latching a drill pipe).

DCL 175 is configured to determine all the relevant instructions for equipment 180 for each operational step of well operations plan 170, and upon determining these instructions, send necessary signals to equipment 180 to perform these instructions. In various embodiments, DCL 175 is further configured to collect data associated with all suitable aspects of operations of rig equipment 180 during the operation of rig equipment 180, and after the completion of the operation of rig equipment 180, and upon collecting the data, transmitting the data to SWA 165B, and, in some cases, to SWA 165A.

For data collection, DCL 175 is configured to rely on multiple specialized rig sensors 181 configured to monitor the performance of rig equipment, and results of operations of the rig equipment. Rig sensors 181 may be associated with various rig equipment 180. An example of rig sensors 181 may include fingerboard latch position sensor for determining if a latch of fingerboard is open or closed, and if, as a result, a tubular section (e.g., a stand of a drill pipe) is held at a specific position by the fingerboard. Rig sensors 181 may also include a stick-up height sensor for determining a height of a stump of a tubular section being held in a well center of a drill floor, a pipe racker position and orientation sensor, a pipe racker accelerometer (for determining motion of a pipe racker), a sensor for determining a position and/or an orientation of an elevator for handling various tubular sections (e.g., for determining a height of the elevator), a sensor for determining whether a latch of the elevator for holding tubular sections is open or closed, a power slips sensor for determining if power slips (devices for securing a tubular section at a well center) are closed onto a tubular section, thus securing the tubular section at the well center, or any other sensors for determining operations of the rig equipment (e.g., sensors for determining operations of a manipulator arm configured to bring tubular sections to a well center, or to auxiliary well center from other locations of the rig (e.g., from a catwalk machine trolley)). Details about these sensors can be found in PCT application No. PCT/US2021/052511 and PCT application No. PCT/US2021/052556, the contents of which is incorporated herein by reference.

In various embodiments, rig sensors 181 may be configured to collect data using any suitable means, such as optical, electrical, temperature, chemical, pressure, or audio means. For example, rig sensors 181 may be optical sensors for determining positions and orientations of different rig equipment. For instance, optical sensors may include Lidar, cameras, lasers, time-of-flight devices, and combination thereof. In some cases, multiple cameras or lasers may be used to perform triangulation for determining positions and orientations of different equipment of the rig. Alternatively, rig sensors 181 may be sensors utilizing sound waves (e.g., ultrasound) for determining distances to various surfaces of the rig equipment. In some cases, sound waves may be used by sensors for determining if a sound emitted by the rig equipment indicates a malfunction or incorrect operation of the equipment (e.g., if the rig equipment emits squeaking sounds).

Further, rig sensors 181 may be configured to measure pressure applied to different surfaces of the rig equipment, measure temperature of different surfaces of the rig equipment, determine electrical resistivity of various circuits, determine presence of chemical elements, or determine other parameters of the rig equipment. For example, in some cases, temperature of different surfaces of the rig equipment may be used via a pyrometer. In some cases, ultraviolet radiation sensor may be used for detecting cracks in the rig equipment.

In some cases, rig sensors 181 may include "active sensors," such as sensors configured to perform an action and determine a response of the rig equipment based on the performed action. For example, an active sensor may be configured to apply a pressure on a particular section of a rig equipment and determine a deformation of the section of the rig equipment based on the applied pressure.

In various embodiments, redundancy may be used for determining data from different sensors. For example, several similar sensors may be used for collecting the same data. Alternatively, different types of sensors may be used for collecting the same data. For instance, to determine a height of a stump, an optical sensor may be used in combination with an ultrasound sensor.

In various embodiments, DCL 175 is configured to perform any suitable set of procedures that are typically done during well construction in an automated way. For example, DCL 175 is configured to perform operations such as tripping in (e.g., building a drill pipe and placing the drill pipe into the well), tripping out (e.g., removing the drill pipe from the well and disassembling the drill pipe), drilling, reaming (e.g., widening a well), circulating (e.g., pumping a fluid through the well), casing running, completion tubing and assemblies running, liner running, cementing, pumping out of hole (e.g., pumping fluid through the drill pipe while raising the drill pipe out of the well, when well conditions are poor or there is a high risk of swabbing; stated another away, creating a reduced pressure in the well underneath the drill pipe as the drill pipe is being pulled out), riser running, and the like. Further, DCL 175 is configured to engage in various testing processes such as BOP testing, friction testing, formation integrity testing, casing testing, and controlling the circulating rates of fluids in a well (e.g., slowing the circulating rates of fluids within a well, for example, during a well kill operation). Various above-mentioned tests are known in the art of offshore drilling. For example, friction testing determines forces pulling a drill pipe upwards, running the drill pipe slowly downwards and when rotating the drill pipe while not moving up or down.

As shown in FIG. 2, feedback data 185 from rig sensors 181 based on operations of rig equipment 180 is transmitted to SWAs 165A and 165B for data analysis. Further data 187A and 187B, which may include feedback data 185, may also be transmitted from SWAs 165A and 165B to respective e-programs 161A and 161B. For example, data 187A and 187B may be transmitted to be later stored in a database as data associated with the well that is being constructed using system 200.

As previously described, SWAs 165A and/or 165B are configured to analyze feedback data 185 and, when necessary, adjust parameters of operations of equipment 180. (Herein, for brevity we will refer to SWA 165B when describing functionality of smart well analytics systems with understanding that either SWA 165A or SWA 165B can perform various operations of smart well analytics systems.) For example, SWA 165B may be configured to adjust a rotational rate of a drill pipe and the weight being applied on the drill bit based on a drilling rate of the drill pipe. For example, if a drill bit of a drill pipe is drilling a soft rock and the rate of penetration (ROP) is high or is increasing, the rotational rate of the drill pipe may be increased to better clean the cuttings being produced from the hole. Or, if ROP is too high to allow the drilled cuttings to be removed effectively the weight being applied to the bit may be reduced in order to slow the ROP. Such operations of adjusting the rotational rate of the drill pipe or applied weight on bit may be performed by SWA 165B in conjunction with corresponding signals from DCL 175 to a suitable equipment 180 (e.g., DCL 175 may be configured to notify a top drive to increase the rotational rate of the drill pipe or decrease the weight being applied to the drill bit). Various other adjustments may be done by SWA 165B, such as an amount of flowrate to use for mud pumps, limitations for torque or pressure, or any other suitable parameter adjustments (e.g., adjustments in a position of a pipe racker based on changes in a height of a stump of a stand of a drill pipe secured at a well center on a drilling floor).

Further SWA 165B is configured to provide warnings (e.g., alarm alerts) when one or more operational parameters of equipment 180 is outside an expected range of operations. For example, a warning is provided when a drill pipe encounters an unusually hard rock or an unusually soft rock (such warning may be based on the ROP). Other warnings may be related to pressure increasing within the well, or to the drill pipe buckling or experiencing unusual loads. Similar warning, regarding parameters of equipment 180 being outside an expected range of operations, can be issued when running casings and/or cementing the well.

In some cases, SWA 165B is configured to determine opportunities that may be taken. For example, if a process of forming a well is adjusted (e.g., if drilling a particular section of a well is taking a longer time than expected), SWA 165B may identify other tasks that can be completed in parallel with the currently performed task. For instance, SWA 165B may identify a task of assembling stands of casing, which can be done in parallel at an auxiliary well. Other tasks that can be done in parallel while drilling include concrete mixing, relocating materials around a rig, fixing the equipment, testing sensors as well as testing operations of the equipment, moving the equipment around the rig, and analyzing data using e-program 161B and/or human operators.

In various cases, adjustments determined by SWA 165B may be an output in a human-readable format and in a machine-readable format. The human-readable format may be used to verify the changes by a human operator, and machine-readable format is used by DCL 175 to execute the changes.

SWA 165B (as well as SWA 165A) are configured to receive drilling data, downhole data, base data from e-program 161B, as well as data obtained from smart tally system 167 and data related to modeling software for modeling performance of equipment 180, as well as real-time updates to the software executed by SWA 165B. In an example embodiment, the drilling data and downhole data are obtained by the use of sensors 181.

The drilling data includes data obtained from sensors of the drilling machinery, and may be a top drive torque, flowrates used for delivering fluids in/out of the well, pressures within the well, well depth, and the like. Further, drilling data are generated by drilling equipment and includes at least one of a torque applied to a drill pipe, a rate of penetration, slip-to-slip times (e.g., time intervals between connecting stands of drill pipe), weight-to-weight times (time intervals between drilling operations), or a weight applied to the drill pipe.

The downhole data includes any relevant data generated during the well construction process, which, in some cases, is provided to DCL 175 by 3rd party service providers upon analysis of data from sensors 181. The downhole data may include a real time trajectory of well during well construction, gas readings in the well, equivalent circulating density (e.g., the effective density exerted by a circulating fluid against the formation that takes into account the pressure drop in the well above the point that is being considered), as well as other logging data obtained by sensors 181 while drilling readings/measurements.

Further, base data from e-program 161B is configured to include any relevant well information from e-program 161B, such as casing details, details of bottom hole assembly (BHA), mud weights in use, as well as other mud properties (e.g., mud viscosity).

Further, SWA 165B may receive data from smart tally system 167, which, in an example embodiment, includes information about various tubulars available to the rig, including accurate depths of all tubulars and tubular components including tooljoints.

Example alarms that may be issued by SWA 165B include positive kick indicator alarms, which may include a rate of change-based volume alarms (trip tank, active system), rate of change-based flow alarm, rate of change of lost circulation alarm, improper trip tank fill alarm, and similar alarms known in the art. Based on the alarms, SWA 165B may be configured to perform positive kick indicator automated steps such as provide recommendation to flowcheck, provide recommendation to shut the well in, as well as to automate space out of the work string across the BOP to allow the selected rams to be closed based on a position of a tooljoint. It should be noted that the position of the tooljoint relative to the selected ram (a position of the ram is a known fixed point) is provided, in some instances, by smart tally system 167, as it keeps track of the exact position of all tubular components at all times during the well construction. Further, positive kick indicator automated steps include automated shut-in if no response is provided by a driller over a predetermined time, a predetermined volume increase (e.g., when there is an increase in a volume of mud flowing out or into the well) or a predetermined rate of flow increase (e.g., when there is an increase in a flow rate of the mud flowing out of or into the well). In various cases, during the automatic shut-in, DCL 175 is configured to space out the drill pipe in the BOP, stop the pumps, stop rotation of the drill pipe, and shut the well control ram.

After completion of automated shut-in, DCL 175 is configured to perform an automated hang-off by closing the hang-off ram and by landing out a predetermined weight on the hang-off ram. For example, when using an annular preventer to shut in a well, a hang-off ram (also referred to as a pipe ram) is closed and the drill pipe can be configured to be coupled to the pipe ram, such that the pipe ram supports the drill pipe in the well. In an example embodiment, a tooljoint of the drill pipe is configured to rest on the pipe ram. In an example embodiment, the pipe ram can support the full weight of the drill pipe should it be necessary to disconnect the drill pipe from the well. Further, landing out a predetermined weight on the hang-off ram may include placing weight on the hang-off ramp (e.g., placing the weight of mud) to prevent a kick from the well.

Other warnings performed by SWA 165B include well control warnings such as positive and negative drilling break alarms (rapid increase in penetration rate), a pump speed (speed can be affected by light fluid entering the wellbore from a kick), pump pressure (can be affected by drilling into a higher pressure formation), a hookload (e.g., a combined force needed to pull up a top drive when it is pulling up a drill pipe can be affected by a light fluid entering the wellbore), unusual values of equivalent circulating density (ECD) which can be affected by a light fluid that enters the wellbore at a high pressure, gas levels (increasing gas may indicate that a kick is occurring, i.e. unplanned influx of gas from the formation), or changes in mud properties (the mud properties can be affected when mud is contaminated by formation fluids, and such changes in mud properties may trigger extended alarms).

Other warnings issued by SWA 165B include presence of cutting beds (the presence of cutting beds can result in a potential accumulation of cuttings in the hole affecting the ability to progress the well or increasing the chances of becoming stuck). Further, warnings may be associated with unusual torque and drag characteristics of a drill pipe or unusual ECD values.

Other functions performed by SWA 165B may be associated with drilling control and optimization as well as tripping control and visualization. For example, drill control and optimization operations of SWA 165B may include generation of rate of penetration (ROP) heat maps and facilitating parameter optimization by plotting parameter (and combination of parameters) such as rotational speed, weight being set down on the drill bit, and a flowrate of fluids circulating in the well, as functions of resultant rate of penetration. Further, SWA 165B is configured to generate drill off test heat maps and optimize parameters by experimenting with different parameter combinations to find the best set of parameters for increased ROP.

Further, SWA 165B is configured to issue pack off alarms related to cuttings and loose formations building up in the well, which can block a flow path for fluids circulating in the well and cause an increase in downhole pressure being applied to the formation, which if left unchecked could damage the formation.

Tripping control and visualization operations of SWA 165B may include swab and surge alarm and speed control during tripping. Herein the surge alarm is issued if, due to a drill pipe movement downward, an additional high pressure is created in the bottom portion of a well, whereas the swab alarm is issued if, due to the drill pipe movement upwards, a low pressure is created in the bottom portion of the well. Further, tripping control and visualization include visualization (or data) related to location of tubular sections that may not be sheared when closing BOP shear arms. In an example embodiment, SWA 165B is configured to issue an alarm (or a notification) when there is a tubular or component across the BOP which cannot be sheared by the BOP shear rams.

SWA 165B further includes downhole restriction alerts which are due to a physical restriction that hinders or prevents a drill pipe from moving freely. For example, the drill pipe may not be moving freely if a rock has broken off from the side of the hole and prevents the motion of the drill pipe. In an example embodiment, besides the downhole restriction alert, SWA 165B may perform overpull protection actions, such as stopping pulling the drill pipe out of the well if there is an unexpected increase in weight (e.g., when the drill pipe is stuck in the well). Additionally, SWA 165B may perform bridge protection actions, such as quickly stopping the drill pipe from running into the well when a restriction in a well is encountered. Such protection may prevent bucking and/or breaking the drill pipe.

SWA 165B is further used for monitoring pressure in a well when displacing (replacing) fluids in the wellbore. For example, SWA 165B is configured to determine a point of underbalance (a point at which a weight of fluids inside the wellbore is equal to the pressure in the formation located behind a casing or underneath another mechanical barrier (e.g., underneath BHA)). Further, SWA 165B may be configured to perform "sweep tracking" by showing the real time position of small volumes of fluids with different densities being circulated around the well. For instance, a fluid with higher density (herein referred to as a heavy pill) may be pumped through the well to improve the cleanliness of the well by removing cuttings than a lesser dense drilling fluid may not remove.

To further emphasize, e-program 161B (and/or 161A) is configured to optimize well operations plan 170 while seamlessly integrating essential rig specific performance data and equipment capability data and well data. In some cases, to optimize well operations plan 170, e-program 161B performs simulations and optimizations based on rig/well information. e-Program 161B generates optimal rig specific well operations plan 170 sequence and associated parameters (e.g., the machine and human readable sequences are tailored to the selected rig's equipment and performance capabilities). Further, e-Program 161B provides the baseline parameters (e.g., includes but not limited to; length/distance, rotational speed, flowrate, vertical speed, weight, weight on bit) to DCL 175 to allow DCL 175 to execute the automation activities using these parameters. Further, e-program 161B is configured to synchronize the automation applications ensuring system integrity. Synchronization ensures continual update of the cloud-based and rig-based respective computing systems 160A and 160B. It ensures that the approved well operations plan 170 is being implemented, and that SWAs 165A and 165B are provided with all of the current required information and that the entire system 160 is updated with real time/current information on both the cloud and rig instances. Further, system 160 is configured to instruct DCL 175 to execute well operations plan 170 sequences using pre-built automation applications by transmitting instructions (controls and parameters) to the existing drilling control network for DCL 175. In an example embodiment, a human operator (a driller) monitors the progress and can intervene if necessary, however DCL 175 is configured to interface and control any suitable rig equipment including the BOP, the vessel management system (VMS), the deck cranes and all other applicable rig systems.

As described above, SWAs 165A and 165B continuously monitor the rig and well sensors/data and analyze performance based on current, expected, and predicted conditions. SWAs 165A and 165B provide insight and make automated adjustments as necessary to optimize well execution and eliminate invisible lost time (ILT) and non-productive time (NPT). For example, in the unexpected well event SWA 165B is configured to automatically secure the well if no actions are taken by a driller. The automated instructions may be in the form of alarms or recommendations to be accepted by the driller prior to being implemented by SWA 165B or they may be implemented without a requirement for the driller to manually confirm beforehand. As described above, SWA 165B is configured to provide alarms and recommendations which may include but are not limited to: recommendations to flowcheck the well, shut-in the BOP, update parameters (e.g. includes but not limited to; length/distance, rotational speed, flowrate, vertical speed, weight, weight on bit), space out the toolstring in the BOP, circulate the hole clean (e.g., remove debris, such as cuttings using mud circulation), reduce rate of penetration, slow down the tripping speed, or increase the tripping speed). Further, SWA 165B (and/or SWA 165A) identifies continuous improvement opportunities to enhance performance of well construction for both the current well and for future wells. In an example embodiment, SWA 165B (and/or SWA 165A) is configured to align well construction operations with offline activities as well as align stages of deck operations to ensure the rig activities are coordinated and the well is executed effectively.

In an example embodiment, SWA 165B is configured to interact with DCL 175 directly through a data link 166, as shown in FIG. 2. For example, SWA 165B is configured to submit commands to DCL 175 via a data link 166. In an example embodiment, based on received feedback data 185, SWA 165B is configured to react quickly and adjust well construction operations to prevent equipment damage. Also, DCL 175 can be configured to acknowledge commands or report issues or failures to execute the commands. In some cases, preventing equipment damage leads to significant reduction in time that is needed to construct a well, thus, correct adjustments to well construction operations result in overall reduction in costs associated with the well construction. For example, when SWA 165B determines that a drill pipe is experiencing twisting action due to imbalance of torques along a length of the drill pipe (e.g., if a portion of the drill pipe is being stuck in a section of a well), SWA 165B is configured to reduce or stop rotation of the drill pipe by sending appropriate instructions to DCL 175 via data link 166. Additionally, or alternatively, SWA 165B may be configured to instruct DCL 175 to move the drill pipe vertically upward (or downward) to reduce the twisting action of the drill pipe.

Further, in various embodiments, e-program 161B and/or e-program 161A is configured to manage changes to well operations plan 170 via a suitable MC process and re-optimize well operations plan 170 based on modifications to well operations plan 170. Further, e-program 161B and/or 161A is configured to re-submit new optimized well operations plan 170 to synchronize with new optimized well operations plan 170 with the current state of operations performed during well construction.

In various embodiments, well operations plan 170 may include at least some operations that are performed by a human operator. In various cases, operations performed by a human operator are interleaved with operations performed by rig equipment. For example, BOP tests (that can be automated by the DCL 175) can only be done after a human operator performs latching up the BOP to the wellhead (which is an operation that is typically performed by a human operator). In various cases, e-program 161B (or SWA 165B) keeps track of confirmations from people and rig equipment 180 and verifies that all steps are followed. Further, e-program 161B (or SWA 165B) is configured to issue a warning or prevent an execution of a next operation without the necessary confirmations received from a human operator or from rig equipment 180.

Figure 3A:
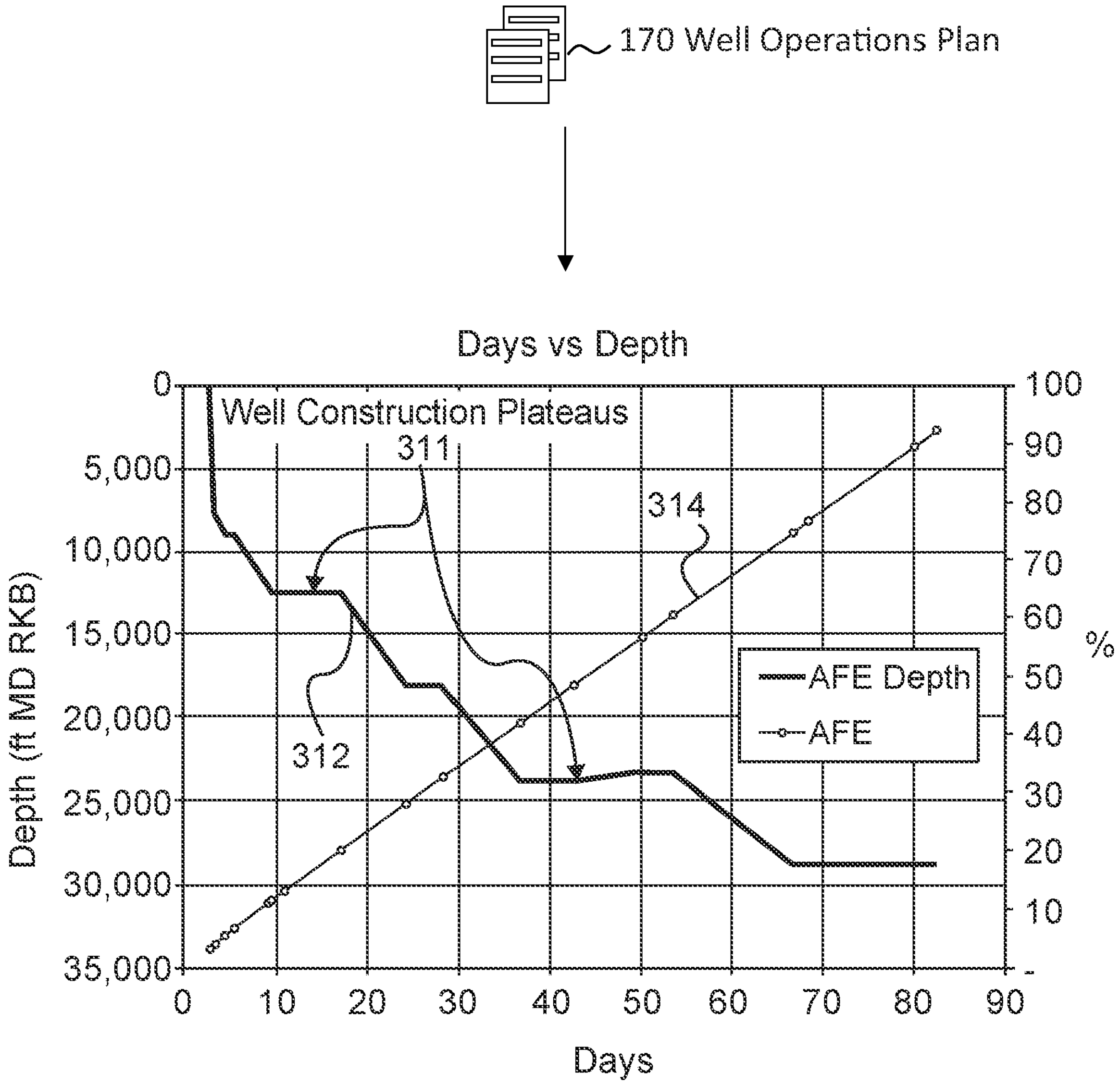
FIG. 3A is a human readable output of an example graph showing the time progression of well construction according to an embodiment of a well operations plan. The bottom graph is an example time depth curve.

In various embodiments, as described above, well operations plan 170 includes data in a format that can be read by a human operator. For example, well operations plan 170 includes tables outlining sequence of steps to be performed for well construction. In some cases, well operations plan 170 may include graphs and/or other visualizations associated with the well construction. For example, FIG. 3A shows a graph 312 of well depth as a function of time (as a function of number of days) needed for constructing the well (herein such a graph is also referred to as a time depth curve). As seen from FIG. 3A, graph 312 include well construction plateaus 311—time phases of well construction when the depth of the well is not increasing. These time phases of well construction correspond to processes related to enforcing walls of the well (e.g., running well casing and laying cement), testing the well (e.g., testing the well for gas), cleaning the well (e.g., removing cuttings from the well), and pumping fluids through the well. FIG. 3A also shows graph 314 illustrating well construction progress as a function of time.

FIG. 3B shows a human-readable sequence of example operations 321-331 of well construction. Operation 321 includes running a riser and a BOP. For example, running the riser includes assembling the riser from riser joints, and running the BOP includes lowering the BOP to a wellhead. Operation 323 includes performing various equipment tests (e.g., performing BOP test) prior to well construction. Operation 325 includes drilling a well, and operation 327 includes running a casing into the drilled well to enforce the well. Operation 329 includes setting seal assembly, and operation 331 includes pressure testing the casing.

FIG. 3C shows a more specific human-readable sequence of example operations (steps) that may be done during well construction, as compared to FIG. 3B. Such list of steps may be similar to operations 321-331 but includes further details. For example, riser and BOP are run and latched to the wellhead at step 1, and various equipment tests (e.g., Deadman test, auto-shear test, remotely operating vehicle (ROV) hot-stab test, subsea emergency disconnect sequence (EDS) test, and casing test) are performed at step 2. The above tests are typical equipment tests that may be performed during a well construction and are well known. For example, when performing the Deadman test, the BOP safety system is designed to automatically shut in the wellbore in the event of a simultaneous absence of hydraulic supply and control of both BOP's subsea control pods. ROV hot-stabs are connectors for receptacles that connect directly to a BOP to actuate the BOP rams to close, open, or perform other BOP functions as well as to control power hydraulic tools, transfer fluids, and perform various other controls of hydraulic functions. These hot-stabs and receptacles require testing when operating a well. EDS testing includes testing equipment (e.g., BOP, pumps, fail-safe valves) leaving the BOP stack and controls in a desired safe state (e.g., shut-in the well) and disconnecting the LMRP from the lower stack. Further casing test includes pressure testing casing as known in the art of drilling. At step 3, connector test may be performed (herein connector test includes performing test on connections between the riser connector and the BOP stack, as well the wellhead connector and BOP stack). Further, at step 3, BOP test may be performed where all components of the BOP such as annulars, wellhead components, all choke manifold, choke & kill valves and their respective connections must be function and pressure tested. At steps 4-5, various drilling and testing operations may be performed, such as drilling out a shoe track, performing formation integrity test (FIT) and leak-off test (LOT), drilling holes of various diameters and lengths (e.g., drilling 18⅛"×21" hole to 17,000 measured depth (MD) or true vertical depth (TVD)). Further, a liner may be run, and cement may be placed at step 6. At step 7, drilling may be further carried out, and at step 8 a casing is run and cemented. At step 9, a seal assembly is set and at step 10 a pressure test for the casing may be performed.

Figure 4:
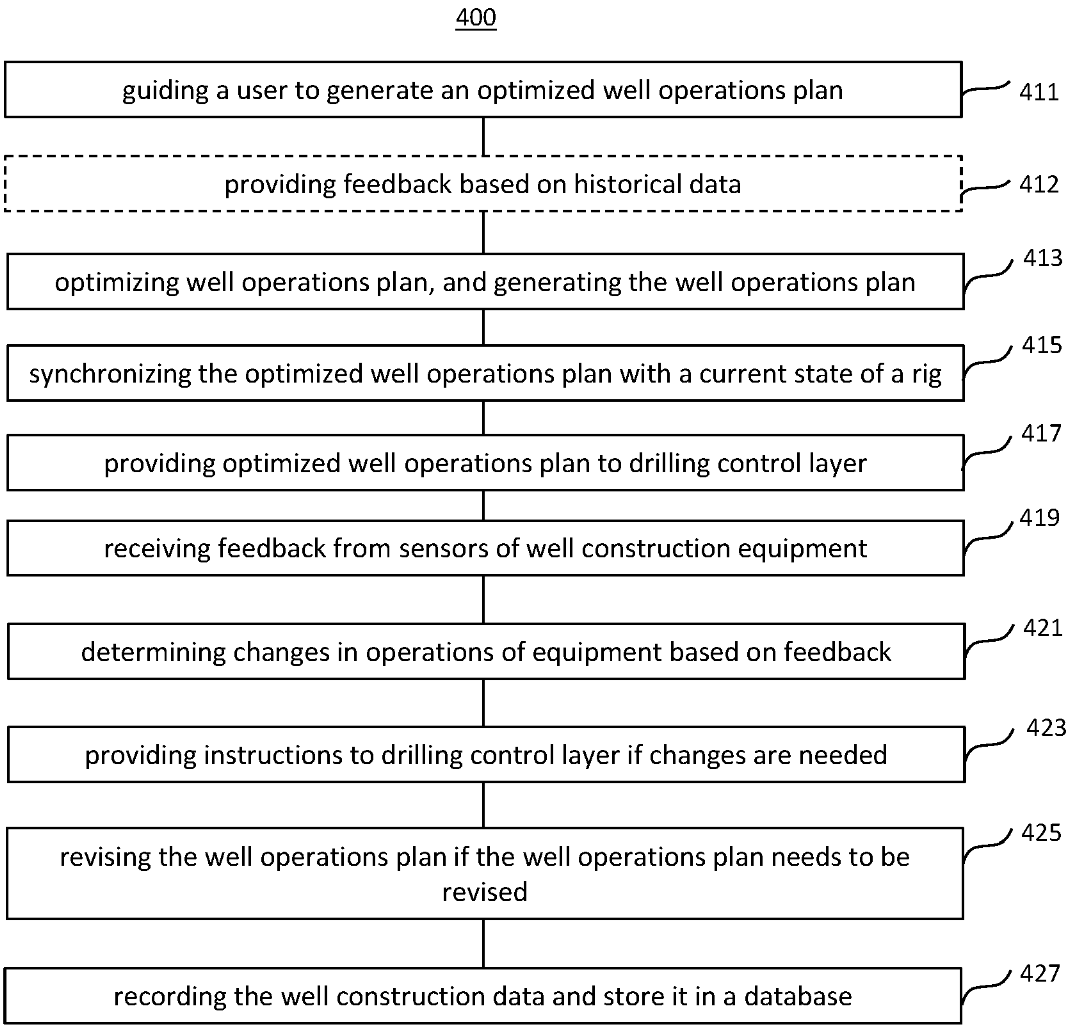
FIG. 4 is an example process for performing integrated end-to-end well construction, according to an embodiment.
Figure 5A:
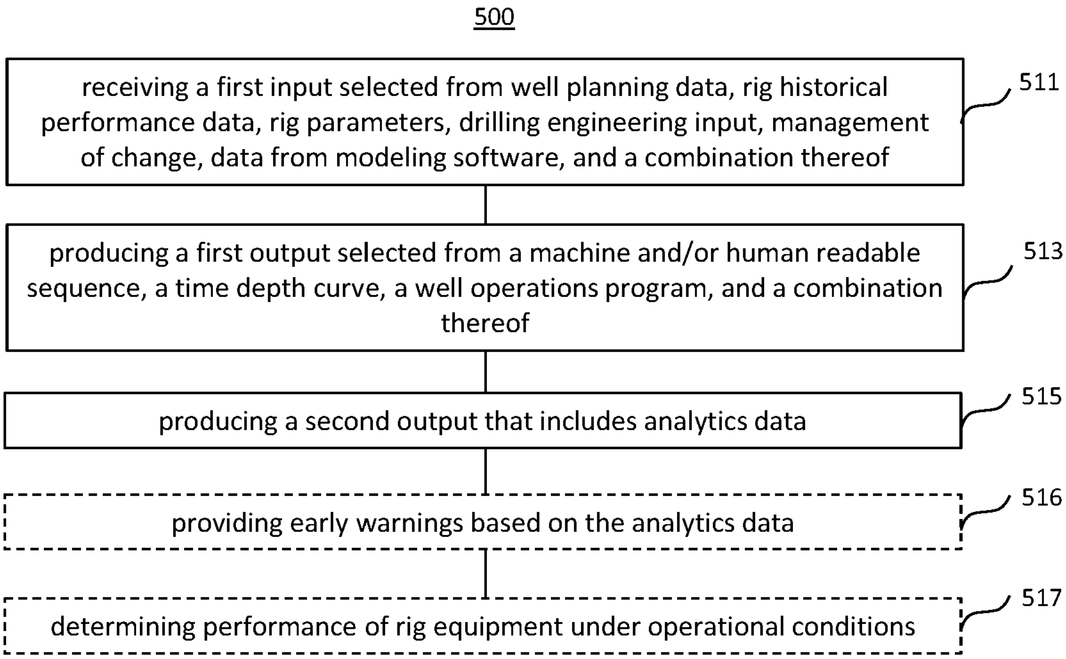
FIGS. 5A-5D are other example processes performed by components of a system implementing integrated end-to-end well construction, according to an embodiment.
Figure 5B:
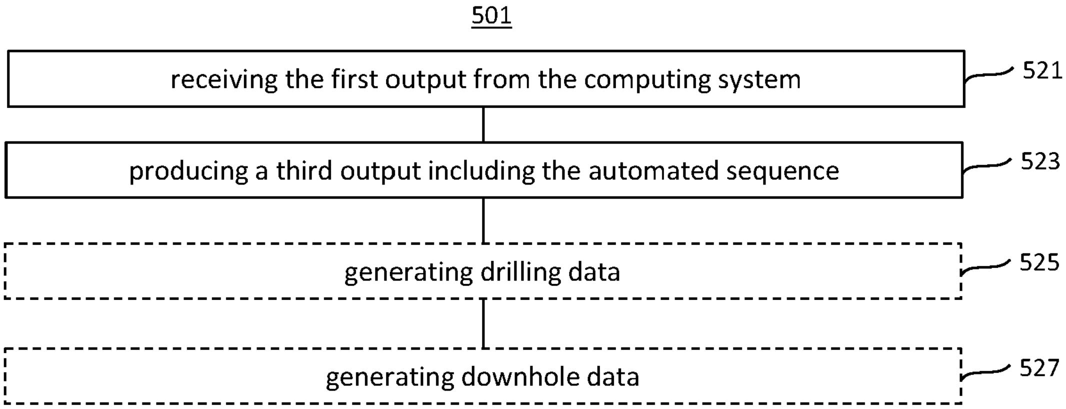
Figure 5C:
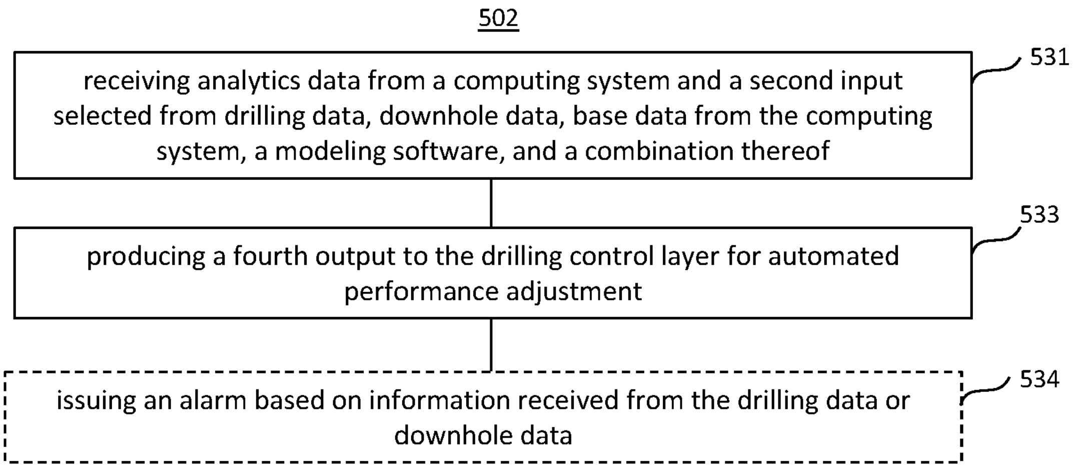
Figure 5D:
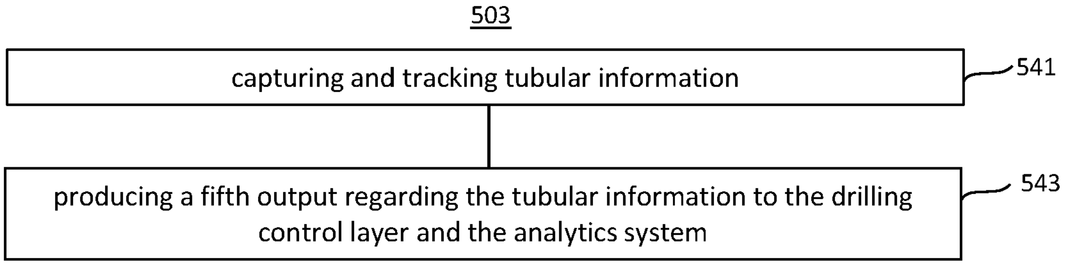

FIG. 4 shows an example process 400 for performing integrated end-to-end well construction. At step 411 of process 400, e-programs 161A and/or 161B are configured to guide a user to generate an optimized well operations plan (WOP) such as well operations plan 170 described above. Step 411 is a planning step for the well construction. As described above, step 411 may use well input data (e.g., well input data 102, as described above) to generate well operations plan 170. In some cases, e-program 161A (or 161B) provides an interface to a user for selecting well parameters, confirming sequence of steps of well operations plan, or modifying the well operations.

At an optional step 412, e-program 161A (or 161B) is configured to provide feedback regarding well planning data 110, based on historical data (e.g., historical well data 103, as show in FIG. 2). For example, based on historical data, e-program 161A (or 161B) can suggest changes to well input data 102 (e.g., suggest that the well needs to be drilled deeper based on historical well data 103 for location of gas and/or oil at the well construction location).

At step 413, e-program 161A (or 161B) is configured to receive inputs from a human operator, as well as well input data 102, and generate the optimized well operations plan 170. At step 415, e-program 161A (or 161B) is configured to synchronize the optimized well operations plan 170 with a current state of rig 415. For example, when at least some of the well construction operations are already performed, the synchronization ensures that the sequence of steps described in the optimized well operations plan 170 continues the well construction steps that have already been performed. At step 417, e-program 161B is configured to provide well operations plan 170 to DCL 175. During the well construction at any suitable time, at step 419, a smart well analytics system (e.g., SWA 165B or SWA 165A) is configured to receive feedback from rig sensors (e.g., sensors 181) associated with rig equipment 180. Further, at step 421, SWA 165B (or, in some cases, SWA 165A) is configured to determine changes in parameters controlling operations of rig equipment 180, based on feedback received from sensors 181, as described above. At step 423, SWA 165B (or SWA 165A) is configured to provide instructions to DCL 175 if/when changes to the parameters are needed.

In some cases, when substantial changes to well operations plan 170 are required (e.g., when gas or oil is not detected at a particular drilling depth), e-program 161B (or 161A) is configured, at step 425, to determine revisions to well operations plan 170 using procedures outlined in management of change 150. For example, e-program 161B (or 161A) is configured to determine that further drilling is needed, or to determine that a new well needs to be started and that the current well needs to be shut-in.

In various embodiments, at step 427, SWA 165B (or SWA 165A) is configured to record data associated with the well construction and store the recorded data in a database, which can be onshore or offshore.

FIGS. 5A-5D are example processes 500-503 executed by different components of system 200 for providing an integrated end-to-end well construction. In an example embodiment, process 500 may be performed by e-program 161B (or 161A), process 501 may be performed by DCL 175, process 502 is performed by SWA 165B (or 165A), and process 503 is performed by smart tally system 167.

At step 511 of process 500, e-program 161B (or 161A) is configured to receive a first input selected from well planning data, rig historical performance data, rig parameters, drilling engineering input, management of change, data from modeling software, and a combination thereof. The first input may be the same as well input data 102, as shown in FIG. 1. Modeling software may include static or dynamic models for hydraulics, hole cleaning, trajectory, wellbore pressures and the like. Outputs from the models may include suggestions such as parameter changes to mitigate modelled conditions from deteriorating or to improve the condition. Additionally, in some embodiments, the modeling software includes Monte Carlo simulations of various drilling activities resulting in duration histograms. For example, the Monte Carlo simulation may use probabilities of different events (e.g., kicks, weather delays, encountering a formation with different characteristics from the well plan, equipment failure, and the like) during drilling operations (the probabilities of different events may be determined based on historical data obtained during various well constructions) to determine expected time that is needed for a well construction as well as for determining a standard deviation of time needed for the well construction. Further, in some cases, the modeling software is configured to estimate a transit time needed for supply vessels to estimate delays in the well construction process.

At step 513, e-program 161B (or 161A) is configured to produce a first output selected from a machine and/or human readable sequence, a time depth curve, a well operations program (including a drilling program), and a combination thereof. The first output may be similar or the same as well operations plan 170, as shown in FIG. 1. In some embodiments, the drilling program includes at least one of information comprising casing details, completion tubing and assemblies details, bottom hole assembly (BHA) details, mud weight in use, or mud properties.

Additionally, at step 515, e-program 161B (or 161A) is configured to produce a second output that includes analytics data. In an example embodiment, the analytics data includes rig equipment specific data (e.g., data about operational parameters for different equipment available for the rig, such torque ranges that may be applied by a top drive, positional ranges for a pipe racker, loads that can be accepted by a drill pipe joint, pressures that can be tolerated by a casing, or any other suitable data required for SWAs 165A and 165B to determine if rig equipment is operating safely and within allowed parameter values. At an optional step 516, SWA 165B (or 165A) is configured to provide early warnings based on the received analytics data. Alternatively, in some cases, the warnings may be based on an analysis of data using e-program 161B (or 161A).

At step 517, e-program 161B (or 161A) is configured to determine performance of a rig equipment (e.g., rig equipment 180) under operational conditions observed during well construction. In an example embodiment, SWA 165B (or 165A) is configured to communicate operational data from rig equipment 180 to e-program 161B (or 161A), and e-program 161B (or 161A) is configured to determine various aspects of performance of rig equipment 180 (e.g., determine how often rig equipment 180 is malfunctioning or non-operational, how precisely rig equipment 180 performs its operations, and how often rig equipment 180 requires maintenance based on data obtained from associated sensors (e.g., sensors 181). Further, e-program 161B (or 161A) is configured to submit the determined data related to various aspects of performance of rig equipment 180 to an onshore or offshore database.

Process 501 includes steps 521-527 performed by DCL 175. At step 521, DCL 175 is configured to receive the first output from e-program 161B (or 161A). For example, DCL 175 is configured to receive well operations plan 170 from e-program 161B (or 161A). At step 523, DCL 175 is configured to produce a third output which includes an automated sequence of instructions to rig equipment 180. The instructions include specific commands arranged in a sequence that need to be executed by rig equipment 180. In an example embodiment, the automated sequence includes instructions for tripping, drilling, circulating, reaming (e.g., enlarging a wellbore), pumping, casing running, liner running, completion tubing and assemblies running, riser running, BOP testing, friction testing, formation integrity testing, casing testing, or other instructions for operating rig equipment 180. At an optional step 525, DCL 175 is configured to generate drilling data, and at another optional step 527, DCL 175 is configured to generate downhole data. In various embodiments, DCL 175 is configured to transmit the drilling data and the downhole data to SWA 165B (or 165A).

Process 502 includes steps 531-534 performed by SWA 165B (or 165A). At step 531, SWA 165B (or 165A) is configured to receive analytics data from e-program 161B (or 161A) and a second input selected from drilling data, downhole data, base data from e-program 161B (or 161A), a modeling software, and a combination thereof, as previously described. At step 533, SWA 165B (or 165A) is configured to produce a fourth output to DCL 175, that includes performance adjustments to operational parameters of rig equipment 180, as previously described. At an optional step 534, SWA 165B (or 165A) is configured to issue an alarm based on information received from the drilling data and/or downhole data.

Process 503 includes steps 541 and 543 performed by smart tally system 167. At step 541, smart tally system 167 is configured to capture and track any relevant tubular information related to tubulars used for the well construction. At step 543, smart tally system 167 is configured to produce a fifth output regarding the tubular information, which can be transmitted to e-program 161B (or 161A) and in some cases to DCL 175 and SWA 165B (or 165A). The tubular information includes at least one of drill pipe depth (herein also referred to as a bit depth), connection torque (e.g., rotational torque needed to connect joints of a drill pipe), tool joint dimensions, on bottom rotating hours for all tubulars (e.g., a duration of time that tubulars are used in the well), tool joint position in the well, location of a non-shearable tubular in the well, or a combination thereof. On bottom rotating hours for all tubulars means the time the tubular has spent inside the formation rotating, which is an indicator of wear because the tubulars are engaged with the formation.

Figure 6:
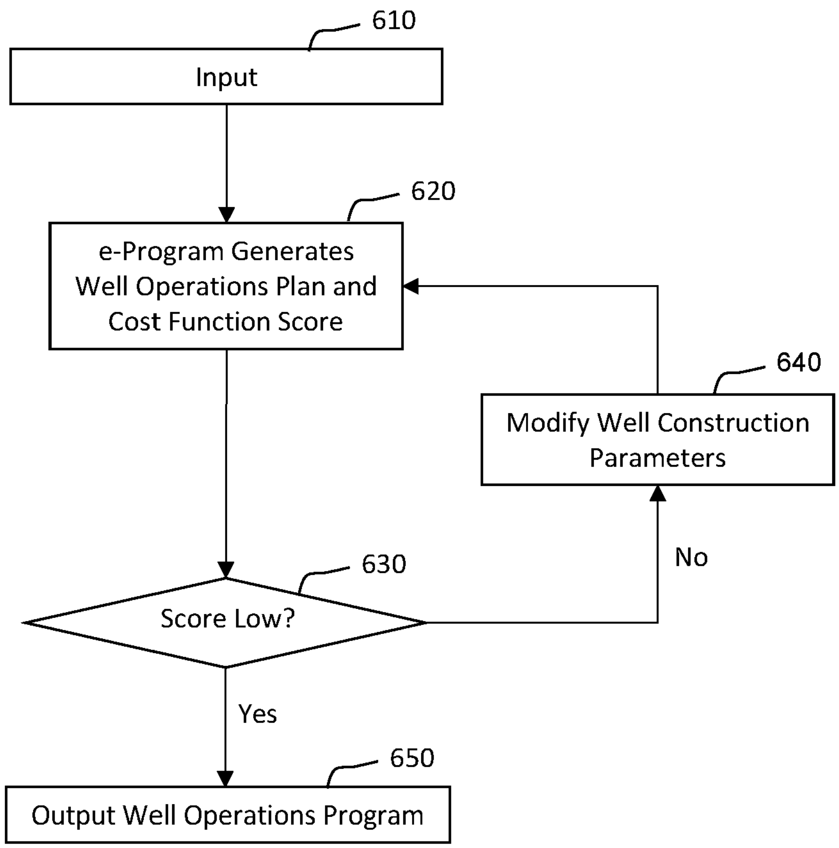
FIG. 6 is an example process for optimizing a well operations plan, according to an embodiment.

FIG. 6 illustrate an example process of optimizing well operations plan 170. At step 610, an input (e.g., well input data 102) is transmitted to e-program 161A (or 161B) and at step 620, e-program 161A (or 161B) generates well operations plan 170 as well as a cost function score (herein, also referred to as a cost function). In an example embodiment, the cost function is calculated as a sum of each individual time needed to perform each well construction operation, and e-program 161A (or 161B) minimizes the sum to produce an optimized well operations plan. In an example implementation, for an operation of well construction, e-program 161A (or 161B) is configured to obtain (from an associated database having historical well construction data) a time distribution associated with such an operation. Some of the operations may not depend on a depth of a well (or any other characteristics of the well). For example, such "well-independent" operations may include various equipment testing operations, such as BOP testing. Other operations may depend on the depth of the well (e.g., tripping drill pipe depends on the depth of the well), and, thus, time distribution for such an operation needs to be correctly adjusted based on the well depth. In some cases, besides estimating a time for an operation, energy and resources may be also accounted when determining the cost function. For example, time, energy, and resources can be accounted for determining a composite cost function having different weights for each category (e.g., having a first weight for time, a second weight for energy, and a third weight for resources).

In various embodiments, the cost function score indicates a cost of constructing a well and includes the time that is needed for well construction. Minimizing the cost function score includes minimizing the time required to construct the well. In some embodiments, the cost function score also considers minimizing materials used for well construction, while preserving the required integrity of the well. Further, any well operations plan 170 generated by e-program 161A is expected to adhere to strict safety standards.

In some embodiments, the cost function includes a determination of an expected total time required for making the well, and wherein the cost function is unacceptably high when the expected total time is above a total time threshold value. In some embodiments, the cost function includes a determination of an expected deviation from the expected total time required for making the well, and wherein the cost function is unacceptably high when the expected deviation is above a deviation threshold value. In another example embodiment, the cost function minimizes the variance of the percentiles (e.g., P10, P50 and P90) of the modeled or simulated total well construction times. Further, when computing a cost function, an estimation of a probability of an unplanned event (or multiple unplanned events) may be determined.

At step 630, e-program 161A (or 161B) evaluates whether the generated cost function score is sufficiently low. For example, e-program 161A may check that the cost function score is lower than a predetermined threshold, and if that is the case (step 630, Yes), e-program 161A (or 161B) is configured to output well operations plan 170 at step 650. Alternatively, if the generated cost function score is not sufficiently low (step 630, No), e-program 161A (or 161B) is configured to further modify well construction parameters at step 640, and proceed to step 620, at which a new optimized well operations plan 170 and an associated cost function score is generated.

In some cases, for calculating the costing function, e-program 161A (or 161B) uses as a multimethod simulation model based on discrete event. Further, the model may be configured to promptly generating probabilistic estimates of duration, cost, risk, CO2 emissions, or any other attributes for several options of operational sequences. The simulation model may be configured to run multiple times, generate various possible well construction sequences based on different input parameters. In some cases, the model may estimate durations of different operations via Monte-Carlo simulation and accept empirical probability distributions for historical rig performances. Rig performances can be constantly updated from recent historical measurements taken from real time monitoring.

Figure 7:
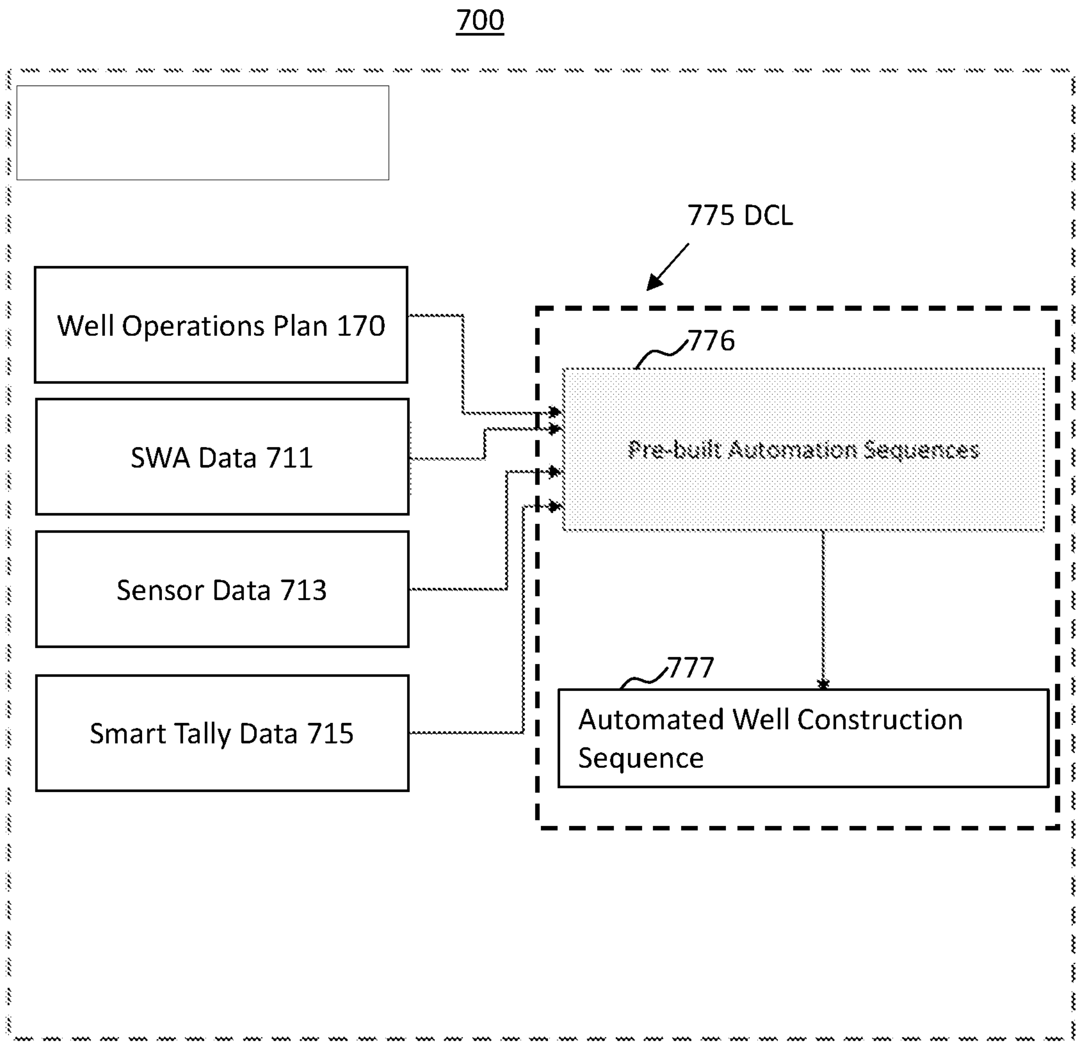
FIG. 7 is an example system having a drill control layer configured to generate an automated well construction sequence, according to an embodiment.

FIG. 7 shows an example implementation of system 700 that includes DCL 775 configured to receive data from e-program 161B such as well operations plan 170, as described above. System 700 may be similar in structure and in function to system 200, as shown in FIG. 2. In the example embodiment, as shown in FIG. 7, data from a smart well analytics system (SWA data 711), sensor data 713 from rig sensors (e.g., sensors 181, as shown in FIG. 2), and data from smart tally system 167 (smart tally data 715) are configured to be used directly by DCL 775. In an example embodiment, SWA data 711 may be the same as data 187B, as shown in FIG. 2, sensor data 713, may be any suitable data from sensors 181, as shown in FIG. 2, and smart tally data 715 may include real time depth of all tubular components. As shown in FIG. 7, DCL 775 may include pre-built automated sequences 776, which, in an example implementation, include a sequence of operations performed by one or more rig equipment 180. An example automated sequence may include tripping in, tripping out, running casing, building a riser, breaking a riser, or other processes that are frequently repeated by rig equipment 180. After receiving inputs such as well operations plan 170, SWA data 711, sensor data 713, as well as smart tally data 715, DCL 775 is configured to confirm or revise pre-built automated sequences 776, and subsequently output a complete automated well construction sequence 777.

Figure 8:
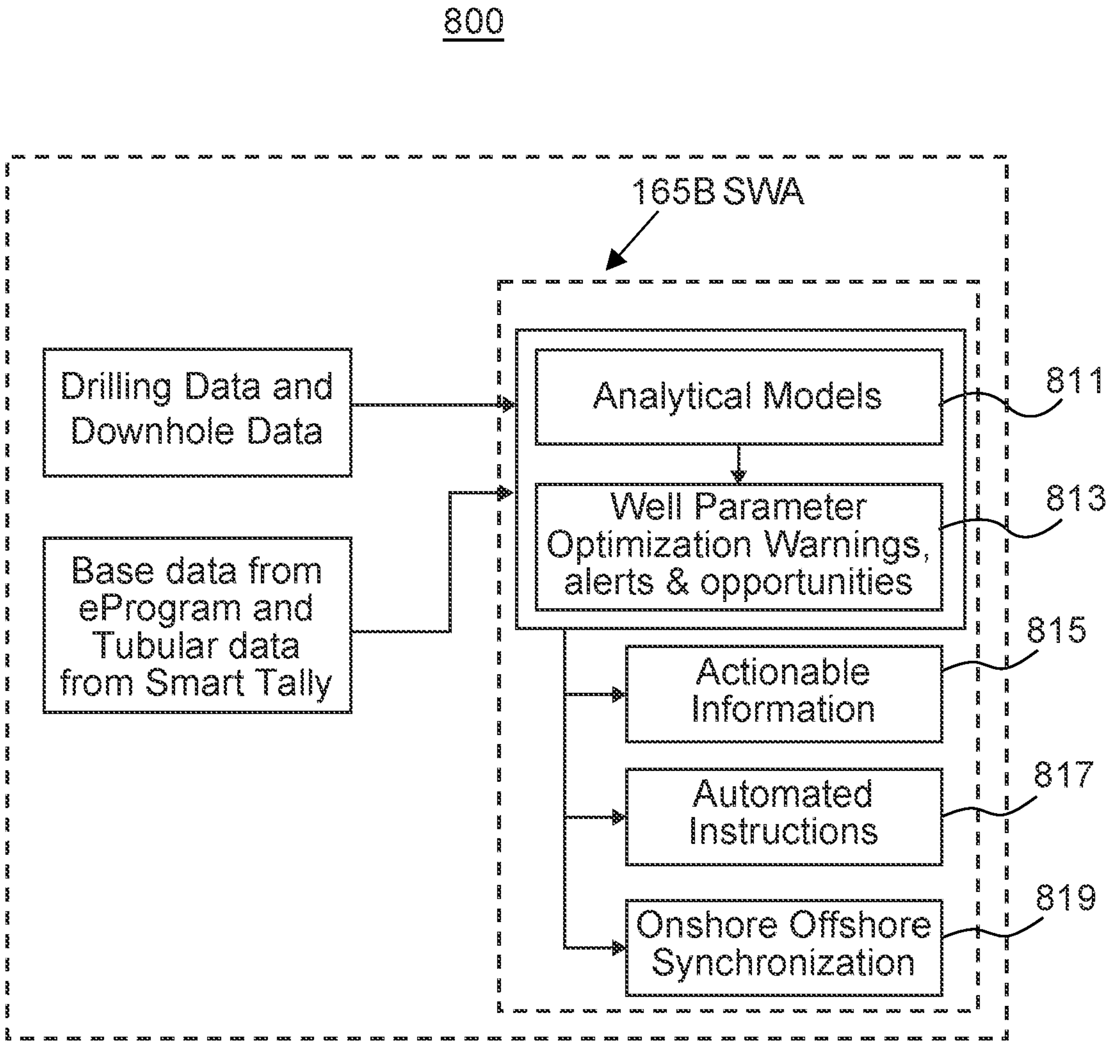
FIG. 8 is an example smart well analytics system, according to an embodiment.

FIG. 8 shows an example implementation of system 800 that includes SWA 165B configured to receive drilling and downhole data, base data from e-program 161B, as well as data from smart tally system 167. In an example embodiment, data from smart tally system 167 may be communicated to SWA 165B via e-program 161B, or, in alternative implementation, be received by SWA 165B directly from smart tally system 167. In an example implementation, SWA 165B includes analytical models 811 configured to determine SWA data 813 which includes well parameters optimization as well as warnings, alerts, and opportunities. For example, analytical models 811 may include static or dynamic models for hydraulics, hole cleaning, trajectory, wellbore pressures and the like. Further, SWA 165B may determine actions based on output of these models to prevent equipment failure or prevent delays in well construction. In an example embodiment, SWA data 813 may be classified as actionable information 815 for which a suitable action is required. The suitable action may include one or more required modifications of operational parameters used by rig equipment 180, or, in some cases, a revision of well operations plan 170. Further, SWA data 813 includes automated instructions which may be transmitted to DCL 775 and executed by DCL 775. Automated instructions may be any type of operations that can be performed by rig equipment 180 in an automated manner (i.e., without an assistance from a human operator). Further, SWA data 813 may include onshore/offshore synchronization data necessary for synchronizing operational steps between SWA 165A and SWA 165B, as well as well operations plan 170 between onshore computing system 160A and offshore computing system 160B.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of the present technology may be implemented using hardware, firmware, software, or a combination thereof. When implemented in firmware and/or software, the firmware and/or software code can be executed on any suitable processor or collection of logic components, whether provided in a single device or distributed among multiple devices.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms “program” or “software” are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A. and at least one, optionally including more than one, B (and optionally including other elements); etc.

The terms "substantially," "approximately," and "about" used throughout this Specification and the claims generally mean plus or minus 10% of the value stated, e.g., about 100 would include 90 to 110.

As used herein in the specification and in the claims, the terms "target" and "control target" are used interchangeably.

In the claims, as well as in the specification above, all transitional phrases such as "comprising," "including," "carrying," "having," "containing," "involving," "holding," "composed of," and the like are to be understood to be open-ended, i.e., to mean including not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An end-to-end well construction system for planning and performing well construction operations, the system comprising:

an e-program configured to:

receive a first input including historical well data and well input data, the historical well data including at least an amount of material used for previous well constructions; and produce, based on the well input data and an analysis of the historical well data, an optimized well operations plan, the well operations plan including a specified quantity of material to be used for well construction; and a drilling control layer configured to receive the well operations plan from the e-program, and to produce, by translating the received well operations plan, an automated sequence including specific operational instructions to rig equipment for automated performance of the operational instructions.

2. The end-to-end well construction system of claim 1, wherein the material includes tubulars.

3. The end-to-end well construction system of claim 2, further comprising a smart tally system configured to track tubulars used for the well construction and output tracking data to the drilling control layer.

4. The end-to-end well construction system of claim 3, wherein the tracking data includes locations of the tubulars.

5. The end-to-end well construction system of claim 2, wherein the tubulars includes casings.

6. The end-to-end well construction system of claim 5, wherein well input data includes a planned quantity of casings.

7. The end-to-end well construction system of claim 1, further comprising a smart well analytics system configured to receive analytics data from the e-program and feedback from the rig equipment and to output, to the drilling control layer, automated adjustments to the operating parameters of the rig equipment.

8. The end-to-end well construction system of claim 1, wherein the historical well data further includes instructions to be implemented to avoid delays associated with previous well constructions.

9. The end-to-end well construction system of claim 1, wherein the e-program is further configured to suggest changes to the well input data based on the historical well data.

10. A method of making a well at a drill site, the method comprising:

receiving, by an e-program, a first input including historical well data and well input data, the historical well data including at least an amount of material used for previous well constructions;

producing, by the e-program based on the well input data and an analysis of the historical well data, an optimized well operations plan, the well operations plan including a specified quantity of material to be used for well construction; and sending, by the e-program, the well operations plan to a drilling control layer configured to translate the received well operations plan into an automated sequence including specific operational instructions that can be executed by rig equipment.

11. The method of claim 10, wherein the material includes tubulars.

12. The method of claim 11, further comprising tracking tubulars used for the well construction and outputting tracking data to the drilling control layer.

13. The method of claim 12, wherein the tracking data includes locations of the tubulars.

14. The method of claim 11, wherein the tubulars includes casings.

15. The method of claim 14, wherein well input data includes a planned quantity of casings.

16. The method of claim 10, further comprising:

receiving, by a smart well analytics system, analytics data from the e-program and feedback from the rig equipment;

outputting, by the smart well analytics system to the drilling control layer, automated adjustments to the operating parameters of the rig equipment.

17. The method of claim 10, wherein the historical well data further includes instructions to be implemented to avoid delays associated with previous well constructions.

18. The method of claim 10, further comprising suggesting, by the e-program, changes to the well input data based on the historical well data.

* * * * *